US012794811B1

(12) United States Patent
Han et al.

(10) Patent No.: US 12,794,811 B1
(45) Date of Patent: Nov. 10, 2026

(54) PREDICTIVE MULTI CLOUD NETWORK OPTIMIZER

(71) Applicant: Juniper Networks, Inc., Sunnyvale, CA (US)

(72) Inventors: Philip Xiaofei Han, San Jose, CA (US); Yuvaraja Mariappan, San Jose, CA (US); Tejas Sanjeev Panse, San Jose, CA (US); Francisco Jose Mendez Cirera, Dover, NH (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 75 days.

(21) Appl. No.: 18/920,463

(22) Filed: Oct. 18, 2024

Related U.S. Application Data

(60) Provisional application No. 63/701,335, filed on Sep. 30, 2024.

(51) Int. Cl.

| | |
|---|---|
| ***H04L 47/125*** | (2022.01) |
| ***H04L 45/00*** | (2022.01) |
| ***H04L 47/122*** | (2022.01) |
| *H04L 45/12* | (2022.01) |
| *H04L 45/586* | (2022.01) |

(52) U.S. Cl.
CPC ............ *H04L 47/125* (2013.01); *H04L 45/70* (2013.01); *H04L 47/122* (2013.01); *H04L 45/12* (2013.01); *H04L 45/124* (2013.01); *H04L 45/586* (2013.01)

(58) Field of Classification Search
CPC ..... H04L 47/125; H04L 47/122; H04L 45/70; H04L 45/12; H04L 45/124; H04L 45/586
See application file for complete search history.

(56) References Cited

U.S. PATENT DOCUMENTS

| | | | | |
|---|---|---|---|---|
| 11,252,183 | B1 * | 2/2022 | Agrawal | H04L 63/145 |
| 11,388,227 | B1 * | 7/2022 | Sun | H04L 45/64 |
| 12,177,123 | B1 * | 12/2024 | Jung | H04L 45/74 |
| 12,307,227 | B1 * | 5/2025 | Kuperman | G06F 8/61 |
| 2019/0166048 | A1 * | 5/2019 | Srinivasan | H04L 45/586 |
| 2021/0036889 | A1 * | 2/2021 | Jain | H04L 45/586 |

(Continued)

OTHER PUBLICATIONS

"Amazon Virtual Private Cloud Connectivity Options," AWS Whitepaper, Apr. 5, 2023, 54 pp.

(Continued)

*Primary Examiner* — Nam T Tran
(74) *Attorney, Agent, or Firm* — Shumaker & Sieffert P.A.

(57) ABSTRACT

A computing device executes a controller for an Application virtual private cloud (VPC) configured to host application instances for clients and a transit VPC comprising routers interconnecting the Application VPC with a remote network. A first path of paths interconnecting the Application and transit VPCs comprises a gateway load balancer endpoint (GWLBE) of the Application VPC and a gateway load balancer (GWLB) of the Transit VPC. A second path of the paths comprises a transit gateway that provides interconnectivity between the Application and transit VPCs. The controller selects a path based on metrics for network traffic exchanged between the Application and Transit VPCs for the application instances received from the routers of the transit VPC. The controller configures the Application VPC to forward subsequent network traffic for the application instances via the selected path.

18 Claims, 10 Drawing Sheets

(56) References Cited

U.S. PATENT DOCUMENTS

| | | | | |
|---|---|---|---|---|
| 2021/0266256 | A1* | 8/2021 | Janakiraman | H04L 45/70 |
| 2022/0279420 | A1 | 9/2022 | Akkipeddi et al. | |
| 2025/0007828 | A1 | 1/2025 | Nallamothu et al. | |
| 2025/0007829 | A1 | 1/2025 | Nallamothu et al. | |
| 2025/0071044 | A1* | 2/2025 | Devendran | H04L 45/124 |
| 2025/0119375 | A1* | 4/2025 | Patel | H04L 45/124 |
| 2025/0202803 | A1* | 6/2025 | Aflatoonian | H04L 45/586 |

OTHER PUBLICATIONS

"AWS Transit Gateway," retrieved from https://aws.amazon.com/transit-gateway/, on May 22, 2024, 7 pp.

"Gateway Load Balancer," retrieved from https://aws.amazon.com/elasticloadbalancing/gateway-load-balancer/#Features, on May 22, 2024, 7 pp.

Chadha et al., "VPC Routing Enhancements and GWLB Deployment Patterns," https://aws.amazon.com/blogs/networking-and-content-delivery/vpc-routing-enhancements-and-gwlb-deployment-patterns/, Jan. 26, 2023, 7 pp.

Davies, "Introducing AWS Gateway Load Balancer: Supported architecture patterns," https://aws.amazon.com/blogs/networking-and-content-delivery/introducing-aws-gateway-load-balancer-supported-architecture-patterns/, Nov. 11, 2020, 8 pp.

Gangur et al., "Best practices for deploying Gateway Load Balancer," https://aws.amazon.com/blogs/networking-and-content-delivery/best-practices-for-deploying-gateway-load-balancer/, Jul. 8, 2021, 8 pp.

* cited by examiner

PREDICTIVE MULTI CLOUD NETWORK OPTIMIZER

PREDICTIVE MULTI CLOUD NETWORK OPTIMIZER

This application claims the benefit of U.S. Provisional Application No. 63/701,335, filed on Sep. 30, 2024, the entire content of which is incorporated herein by reference.

TECHNICAL FIELD

The disclosure relates to virtualized computing infrastructure and, more specifically, to path selection within a cloud computing environment.

BACKGROUND

In a typical cloud data center environment, there is a large collection of interconnected servers that provide computing and/or storage capacity to run various applications. For example, a data center may include a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Virtualization within a data center or any environment that includes one or more servers can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operating system-level virtualization. Containers are lightweight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

A cloud data center environment, such as a virtualized data center may provide services for any number of customers. For example, a cloud data center environment may provide services to different customers via virtual private clouds (VPCs). A VPC may be viewed as an extension of a customer operated on-premises (on-prem) network which may be located on the premises of a customer site. As such, through the use of a VPC, a customer may quickly and efficiently scale their on-prem network as needed by adding or subtracting resources resident in a cloud data center through a VPC rather than changing the resources in the on-prem network itself. A VPC implementation may include the use of a virtual private cloud gateway device.

SUMMARY

A VPC is a virtual network of computing nodes that may resemble a traditional network that an enterprise or other entity may operate in an on-premises (on-prem) data center or as an extension of such a traditional network. A VPC may be a service offered by a service provider in a cloud computing infrastructure. As a cloud computing infrastructure may include numerous resources which may be assigned to various customers, a customer may quickly and efficiently scale its own network resources through the use of a VPC, avoiding having to physically scale the on-prem data center. A VPC may include one or more subnets. A subnet may include a range of IP addresses of a VPC. A VPC gateway may connect a VPC to a network external to the VPN. A VPC gateway may provide connectivity for an on-prem data center to virtual compute instances (e.g., Pods, virtual machines, and/or other types of deployable virtual compute instance) operating in the cloud computing environment, thereby expanding the compute capabilities of the on-prem data center without physically adding additional resources to the on-prem data center.

A VPC gateway is a physical or virtual device that may be used by a cloud service provider to provide access to a VPC for a customer. In some examples, a VPC gateway may not provide a mechanism for interacting with an underlay network using standard networking protocols. For example, a VPC gateway may not be capable of reading or learning from BGP prefixes. In other words, a VPC gateway may not be a BGP speaker. Thus, the VPC gateway may not be natively capable of routing or switching BGP traffic to or from BGP speaking virtual compute instances in the data center environment. Thus, there may be a need to provide seamless connectivity between customer workloads of a VPC and on-prem infrastructure. Moreover, there may exist a number of different forms of interconnectivity between VPCs, including the use of gateway load balancers (GWLBs) through which two VPCs may communicate, or the use of a transit gateway that provides interconnectivity between two VPCs. Each different forms of interconnectivity between VPCs may be associated with different usage costs and billing schemes, as well as provide different performances and capabilities, such that it may not be trivial to determine an optimal interconnectivity scheme with which to use for communication between VPCs.

In accordance with the techniques of the disclosure, a VPC connectivity selector may select a particular scheme for communication between VPCs by considering a number of different characteristics associated with the VPCs, as well as the underlying network traffic generated by applications supported by the VPCs. In this fashion, a network employing the VPC connectivity selector described herein may improve resource usage by the VPCs, reduce occurrence of network congestion, and improve the administrative overhead of configuring connectivity between VPCs, which may otherwise be prone to human error and/or suboptimal configuration.

In one example, a network controller may execute a controller for an Application VPC and a transit VPC. The Application VPC hosts application instances for one or more clients, the application instances executed by one or more computing devices. The transit VPC comprises one or more network devices (e.g., one or more routers) that interconnect the Application VPC with a remote network. A plurality of paths interconnect the Application VPC and the transit VPC, for example, a first path comprises a gateway load balancer endpoint (GWLBE) of the Application VPC and a gateway load balancer (GWLB) of the transit VPC. A second path comprises a transit gateway that provides interconnectivity between the Application VPC and the transit VPC.

The controller receives, from the one or more routers of the transit VPC, metrics for network traffic exchanged between the Application VPC and the transit VPC for the application instances. The controller selects, based at least in part on the received metrics, one of the first path and the second path. The controller configures the Application VPC to forward subsequent network traffic for the application instances via the selected path. In some examples, the controller configures the Application VPC to forward subsequent network traffic for the application instances via the selected path by programming the selected path within a routing base of the Application VPC.

The techniques of the disclosure may provide specific improvements to the computer-related field of virtualized computing infrastructure that have one or more practical applications. For example, a network architecture employing the VPC connectivity selector described herein may provide improved resource usage by the VPCs over conventional virtual network architectures, as well as may reduce the occurrence of network congestion. Furthermore, a network architecture employing the VPC connectivity selector described herein may improve the administrative overhead of configuring connectivity between VPCs, which may otherwise be prone to human error, suboptimal configuration, and under-utilized resources.

In one example, this disclosure describes a computing system comprising processing circuitry having access to a memory, the processing circuitry configured to: execute a controller for an Application virtual private cloud (VPC) configured to host application instances and a transit VPC comprising one or more routers configured to interconnect the Application VPC with a remote network, wherein a plurality of paths interconnect the Application VPC and the transit VPC, a first path of the plurality of paths comprising a gateway load balancer endpoint (GWLBE) of the Application VPC and a gateway load balancer (GWLB) of the transit VPC, and a second path of the plurality of paths comprising a transit gateway that provides interconnectivity between the Application VPC and the transit VPC, and wherein the controller is configured to: receive, from the one or more routers of the transit VPC, metrics for network traffic exchanged between the Application VPC and the transit VPC for the application instances; select, based at least in part on the received metrics, one of the first path and the second path; and configure the Application VPC to forward subsequent network traffic for the application instances via the selected path.

In another example, this disclosure describes a method comprising: receiving, by a controller for an Application virtual private cloud (VPC) configured to host application instances and a transit VPC comprising one or more routers configured to interconnect the Application VPC with a remote network, from the one or more routers of the transit VPC, metrics for network traffic exchanged between the Application VPC and the transit VPC for the application instances, wherein the controller is executed by processing circuitry; selecting, by the controller and based at least in part on the received metrics, one of a first path of a plurality of paths interconnecting the Application VPC and the transit VPC, the first path comprising a gateway load balancer endpoint (GWLBE) of the Application VPC and a gateway load balancer (GWLB) of the transit VPC, and a second path of the plurality of paths comprising a transit gateway that provides interconnectivity between the Application VPC and the transit VPC; and configuring, by the controller, the Application VPC to forward subsequent network traffic for the application instances via the selected path.

In another example, this disclosure describes non-transitory, computer-readable media comprising instructions that, when executed, are configured to cause processing circuitry to: execute a controller for an Application virtual private cloud (VPC) configured to host application instances and a transit VPC comprising one or more routers configured to interconnect the Application VPC with a remote network, wherein a plurality of paths interconnect the Application VPC and the transit VPC, a first path of the plurality of paths comprising a gateway load balancer endpoint (GWLBE) of the Application VPC and a gateway load balancer (GWLB) of the transit VPC, and a second path of the plurality of paths comprising a transit gateway that provides interconnectivity between the Application VPC and the transit VPC, and wherein the controller is configured to: receive, from the one or more routers of the transit VPC, metrics for network traffic exchanged between the Application VPC and the transit VPC for the application instances; select, based at least in part on the received metrics, one of the first path and the second path; and configure the Application VPC to forward subsequent network traffic for the application instances via the selected path.

The details of one or more examples of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
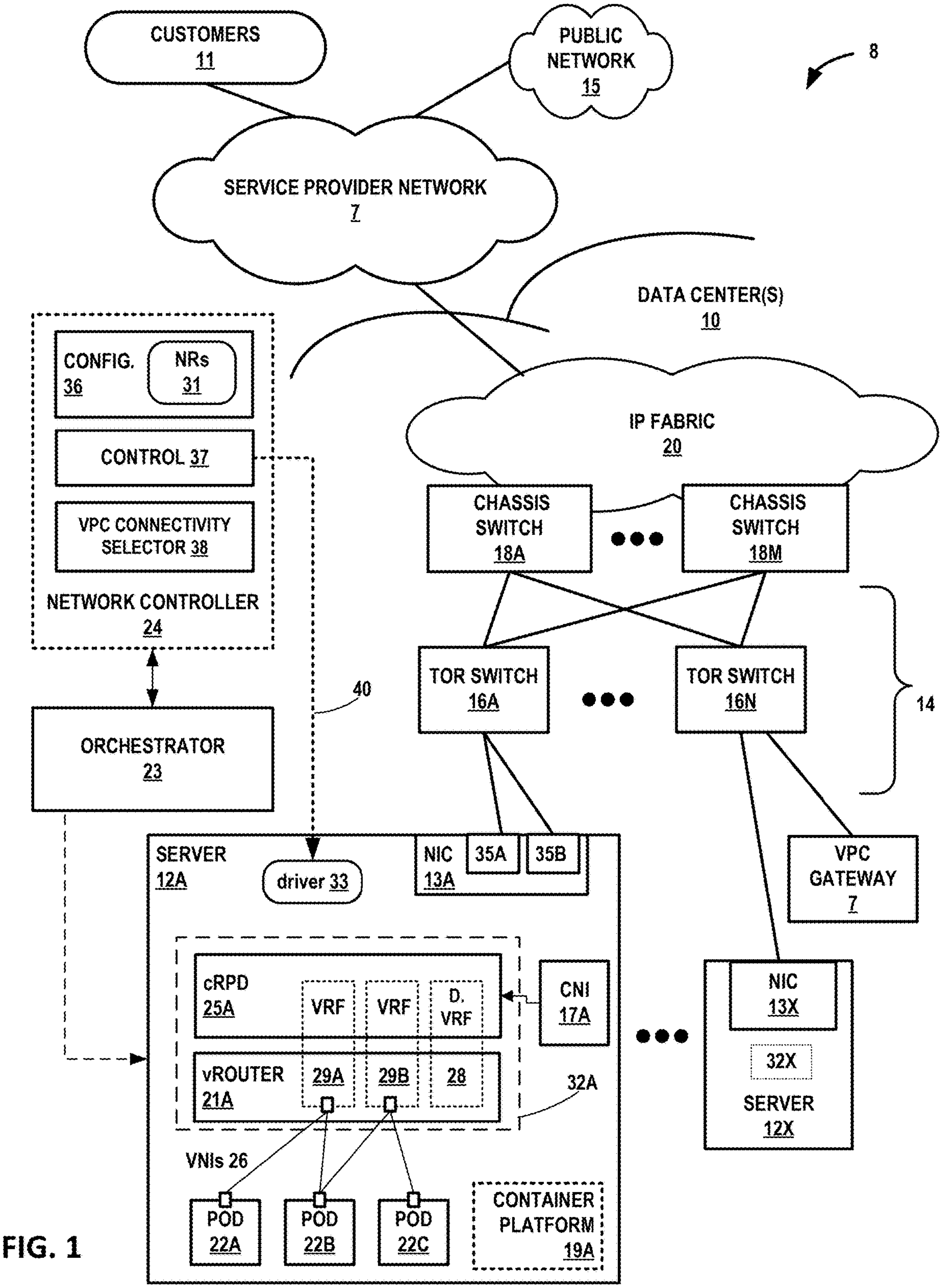
FIG. 1 is a block diagram illustrating an example computing infrastructure according to one or more aspects of this disclosure.

A cloud-native approach may include functional blocks which are decomposed into microservices. The microservices are deployed as containers on compute nodes and orchestrated by an orchestration system, such as Kubernetes (abbreviated as "K8s"). Kubernetes deploys containers using Pods. K8s networking between pods is via plug-ins called Container Networking Interfaces (CNIs) (also known as Container Network Interface plugins). However, the networking capabilities of typical CNIs are rather rudimentary and not suitable when the containerized network functions the CNI serves play a pivotal role within a network, such as a telecommunications network.

A cloud-native router (CNR), as described herein, provides a better fit for these situations, and may have one or more advantages over a conventional router. A router has a control plane and a forwarding plane. The control plane participates in dynamic routing protocols and exchanges routing information with other routers in the network. It downloads the results into a forwarding plane, in the form of prefixes, next-hops and associated SR/MPLS labels. Implementations described herein are modular, in the sense that the control plane is agnostic to the exact details of how the forwarding plane is implemented. In a hardware router, the forwarding plane may be based on custom ASICs.

In contrast to a conventional router, the CNR is a virtualized router. However, the routing protocol software is functionally similar to a conventional router in both cases. This means the CNR benefits from the same highly comprehensive and robust protocol implementation as the hardware-based routers that underpin some of the world's largest networks.

A CNR is a containerized router that allows a compute node, such as an x86- or ARM-based host, to be a first-class member of the network routing system, participating in protocols such as Intermediate System to Intermediate System (IS-IS) and Border Gateway Protocol (BGP) and providing Multiprotocol Label Switching/Segment Routing (MPLS/SR)-based transport and multi-tenancy. In other words, rather than the platform being an appendage to the network (like a customer edge (CE) router), it may be operating as a provider edge (PE) router or other device within a provider network, such as a in a cloud computing environment.

The CNR uses a containerized routing protocol daemon (cRPD) Control Plane and a virtual router (vRouter) forwarding plane to deliver high performance networking in a small footprint, software package that is functionally similar to a non-virtual router, a physical network function (PNF). The forwarding plane may be implemented via a choice of DPDK, Linux Kernel or Smart-NIC. The complete integration delivers a K8s CNI-compliant package, deployable within a K8s environment (e.g., Multus-enabled).

A cRPD is a routing protocol process that is packaged and deployed as a container. cRPD may be executed in the user space of the host as a containerized process. Thus, cRPD makes available the rich routing software pedigree of physical routers on compute nodes. cRPD provides control plane functionality to a containerized router. Existing implementations of cRPD (running on the host) use the forwarding provided by the kernel. This control plane is thus containerized. The compute nodes and kernel may be Linux-based in some examples.

A virtual router is a software entity that provides data plane functionality on the compute node, while the cRPD may provide the control plane functionality. The compute node may be hosting virtual compute instances centrally orchestrated and provisioned. In some cases, the virtual router may further interact with an SDN controller to create overlay networks by exchanging routes, configurations, and other data. A virtual router can run as either a kernel module or a DPDK-based process, for instance. DPDK allows a virtual router to process more packets per second than is possible when running as a kernel module. The virtual router data plane may be containerized. In combination, the containerized cRPD and containerized virtual router may thus be a fully functional, containerized router.

As the CNR is itself a cloud-native application, it supports installation using K8s manifests or Helm Charts. These include the initial configuration of the router, including routing protocols and Layer 3 VPNs to support slices. A CNR may be orchestrated and configured, in a matter of seconds, with all of the routing protocol adjacencies with the rest of the network up and running. Ongoing configuration changes during the lifetime of the CNR, for example to add or remove network slices, may be via a choice of CLI, K8s manifests, NetConf or Terraform.

By adopting a K8s CNI framework, the CNR may mitigate the traditional operational overhead incurred when using a containerized appliance rather than its physical counterpart. By exposing the appropriate device interfaces, the CNR may normalize the operational model of the virtual appliance to the physical appliance, eradicating the barrier to adoption within the operator's network operations environment. The CNR may present a familiar routing appliance look-and-feel to any trained operations team. The CNR has similar features and capabilities, and a similar operational model as a hardware-based platform. Likewise, a domain-controller can use the protocols that it is uses with any other Junos router to communicate with and control the CNR, for example Netconf/OpenConfig, gRPC, Path Computation Element Protocol (PCEP) and Programmable Routing Daemon (pRPD) APIs.

The node executing CNR may participate in IS-IS, Open Shortest Path First (OSPF), BGP, and/or other interior or exterior routing protocols. In addition, MPLS may be used, often based on Segment Routing (SR). The reason for this is two-fold: to allow Traffic Engineering if needed, and to underpin multi-tenancy, by using MPLS-based Layer 3 VPNs. As an alternative, SRv6 could be used instead to fulfill these requirements. Having a comprehensive routing capability is also necessary to implement network slicing. Each slice tenant is placed into its own Layer 3 VPN. The CNR acts as a provider edge (PE) router from the Layer 3 VPN point of view. The CNR therefore exchanges Layer 3 VPN prefixes via BGP with other PE routers in the network, regardless of whether those other PEs are physical routers or CNRs residing on other hosts. Each tenant may be placed in a separate VRF table on each PE, giving the correct degree of isolation and security between tenants, just as with a conventional Layer 3 VPN service. This neatly solves the problem that K8s does not natively provide such isolation. Layer 3 VPN is a tried and tested method for achieving multi-tenancy in networking and is trusted by the many major corporations worldwide who buy this service from their network service providers.

In general, a containerized router operating within a public cloud environment may provide routing control plane functionality for VPC workloads reachable via VPC gateways. The containerized router may execute a routing protocol to learn routes associated with the VPC workloads and may program a VPC route table in a VPC gateway device to cause the VPC gateway device to route traffic towards the containerized router for further routing. Such traffic may include traffic from one or more containers (also referred to as pods). Such an arrangement may be beneficial as the pods and on-prem routers may include border gateway protocol (BGP) speakers, but the VPC gateway may not be BGP-enabled and therefore unable to process BGP advertisements or BGP-advertised routing information to determine how to route overlay traffic sourced by or destined to workloads in a VPC, such as BGP traffic.

A VPC gateway, which may be deployed and used by a cloud service provider to provide access to a VPC for a customer, may not be capable of using conventional routing protocols, such as BGP, to process routing protocol messages to obtain routing information, such as advertised routes and prefixes. For example, a VPC gateway may not be a BGP speaker. Thus, the VPC gateway may not be natively capable of processing BGP routes and, as a result, may be unable to perform switching or routing of BGP messages or other traffic according to BGP-advertised routes, to or from BGP speaking pods in the data center environment. Because a CNR by contrast is capable of learning BGP routes and switching and routing BGP and other traffic according to BGP-advertised prefixes, it may be desirable to utilize a CNR to program a VPC route table of a VPC gateway such that the VPC gateway may forward traffic via the underlay network to the CNR for further routing. In this way, the CNR directly programs underlay elements of the cloud infrastructure to have the traffic forwarded to the CNR itself for further routing.

Multi-cloud networking has become crucial for organizations, as evident by the widespread adoption of multi-cloud and/or hybrid architectures. Some benefits of multi-cloud architectures includes optimization of resources and cost. For example, services can be selected from different cloud providers based on specific needs and usage costs. In addition, the use of multi-cloud architectures avoids vendor lock in. Furthermore, multi-cloud architectures may provide improved risk mitigation, because the distribution of workloads across multiple clouds reduces the impact of single-point failures, therefore ensuring operational continuity during cloud outages. In addition, multi-cloud architectures may provide improved performance by enabling the leveraging of cloud services based on geographical proximity to users, which may minimize latency and improve application performance.

Almost all cloud providers offer logically isolated networks. For example, Amazon Web Services (AWS), a subsidiary of Amazon, Inc., refers to such logically-isolated networks as Virtual Private Clouds (VPCs), while Microsoft Azure, provided by Microsoft, Inc., refers to such logically-isolated networks as Virtual Networks. For purposes of consistency, logically isolated networks provided by a cloud provider are referred to with respect to the example of VPCs. However, the techniques of the disclosure may be applied to any logically isolated network provided by a cloud provider, and the use of the term "VPC" herein refers generally to such logically isolated networks, and not to a specific implementation by a specific service provider.

Essentially, a multi-cloud network entails connecting multiple VPCs belonging to the same or different public or private clouds. Applications within one VPC are then be able to communicate with applications in other VPCs over a private network, without consideration to the location or cloud upon which the applications are hosted.

Cloud providers may provide numerous ways within their own clouds to connect VPCs with one another or with private data centers. There are only a few third parties who provide hybrid multi-cloud networking solutions. An organization who wishes to leverage multi-cloud architectures may struggle to understand the myriad services or techniques a cloud provider offers to connect VPCs, as well as the cost implication of each taking into account evolving usage or the communication pattern of the organization's application workloads. Moreover, each application behaves differently. Larger organizations with centralized information technology (IT) teams may find it difficult to switch between cloud connectivity services based on the usage pattern of individual applications so as to minimize the overall cloud provider costs and maximize application network performance.

In accordance with the techniques of the disclosure, a network controller may execute a VPC connectivity selector that understands application traffic patterns, networking services offered by cloud providers, as well as the cost and performance implications of such networking services based on specific application usage trends. The VPC connectivity selector described herein may be capable of automatically switching between different services dynamically, so as to ensure high performance and reduced cloud provider costs. In some examples, the VPC connectivity selector described herein may be part of the functionality provided by a cloud interconnection service.

FIG. 1 is a block diagram illustrating an example computing infrastructure according to one or more aspects of this disclosure. Computing infrastructure 8 may represent a software-defined networking (SDN) architecture system for virtual networks. Example use cases for the SDN architecture include 5G mobile networks, as well as cloud and enterprise cloud-native use cases. An SDN architecture may include data plane elements implemented in compute nodes (e.g., servers 12) and network devices such as routers or switches, and the SDN architecture may also include an SDN controller (e.g., network controller 24) for creating and managing virtual networks. The SDN architecture including network controller 24 described with respect to FIG. 1 is merely one example. The techniques of this disclosure may apply to other data center architectures and SDN controller deployments and implementations.

In this example, the SDN architecture components are microservices and the SDN architecture assumes a base container orchestration platform to manage the lifecycle of SDN architecture components. The SDN architecture may leverage Kubernetes constructs such as Multus, Authentication & Authorization, Cluster API, KubeFederation, Kube Virt, and Kata containers. The SDN architecture may support data plane development kit (DPDK) pods, and the SDN architecture can extend to support Kubernetes with virtual network policies and global security policies. The SDN architecture may be integrated with orchestration platforms (e.g., orchestrator 23) such as Kubernetes, OpenShift, Mesos, OpenStack, VMware vSphere, and with service provider operations support systems/business support systems (OSS/BSS).

In general, one or more data center(s) 10 provide an operating environment for applications and services for customer sites 11 (illustrated as "customers 11") having one or more customer networks coupled to the data center by service provider network 7, such as through VPCs. In some examples, customer sites 11 may be on-premises (on-prem) customer networks. Each of data center(s) 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within any of data center(s) 10. For example, data center(s) 10 may host multiple tenants (customers) each associated with one or more virtual private networks (VPNs), each of which may implement one of customer sites 11.

Service provider network 7 offers packet-based connectivity to attached customer sites 11, data center(s) 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, each of data center(s) 10 may represent one of many geographically distributed network data centers, which may be connected to one another via service provider network 7, dedicated network links, dark fiber, or other connections. As illustrated in the example of FIG. 1, data center(s) 10 may include facilities that provide network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or super-computing, and so on. Although illustrated as a separate edge network of service provider network 7, elements of data center(s) 10 such as one or more physical network functions (PNFs) or virtualized network functions (VNFs) may be included within the service provider network 7 core.

In this example, data center(s) 10 includes storage and/or compute servers (or "nodes") interconnected via switch fabric 14 provided by one or more tiers of physical network switches and routers, with servers 12A-12X (herein, "servers 12") depicted as coupled to top-of-rack switches 16A-16N. Servers 12 are computing devices and may also be referred to herein as "compute nodes," "hosts," or "host devices." Although only server 12A coupled to TOR switch 16A is shown in detail in FIG. 1, data center 10 may include many additional servers coupled to other TOR switches 16 of the data center 10.

Data center(s) may provide Virtual Private Clouds (VPCs) to any of customers 11. Data center(s) 10 may include one or more VPC gateways, such as VPC gateway 7, which may be used to connect VPCs to external networks (e.g., on-prem, other clouds, external VPCs) to provide VPC services to customers 11. VPC gateway 7 may be a physical device or a virtual device, such as a physical or virtual gateway, router, switch or the like. In some examples, VPC gateway 7 may be implemented by one or more of servers 12. In some examples, an CNR may be directly coupled to a VPC gateway. VPC gateways are discussed further herein with respect to FIGS. 2 and 3.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center(s) 10 may also include one or more physical network functions (PNFs) such as physical firewalls, load balancers, routers, route reflectors, broadband network gateways (BNGs), mobile core network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center(s) 10 is merely an example. Other switching architectures may have more or fewer switching layers, for instance. IP fabric 20 may include one or more gateway routers.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements, such as pods or virtual machines, by virtualizing resources of the server to provide some measure of isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., an of data center(s) 10. Each tenant or an application can have one or more virtual networks. Each virtual network may be isolated from all the other virtual networks unless explicitly allowed by security policy.

Virtual networks can be connected to, and extended across, physical Multi-Protocol Label Switching (MPLS) Layer 3 Virtual Private Networks (L3VPNs) and Ethernet Virtual Private Networks (EVPNs) networks using a datacenter 10 gateway router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual routers 21A-21X (illustrated as and also collectively referred to herein as "vRouters 21"), virtual routers running in servers 12 may create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not store any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 21 of servers 12 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e., which have at least one virtual execution element present on the server 12.)

The control plane protocol between the control plane nodes of the network controller 24 or a physical gateway router (or switch) may be BGP (and may be Netconf for management). This is the same control plane protocol may also be used for MPLS L3VPNs and MPLS EVPNs. The protocol between the network controller 24 and the virtual routers 21 may be based on XMPP, for instance.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and instead provide an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. Virtual execution elements may represent application workloads. As shown in FIG. 1, server 12A hosts one virtual network endpoint in the form of pod 22 having one or more containers. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

Servers 12 each includes at least one network interface card (NIC) 13, which each includes at least one interface to exchange packets with TOR switches 16 over a communication link. For example, server 12A includes NIC 13A. Any of NICs 13 may provide one or more virtual hardware components 21 for virtualized input/output (I/O). A virtual hardware component for I/O maybe a virtualization of the physical NIC (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components 21. As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass a Contrail or Tungsten Fabric virtual router, Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). In some examples, packets received by virtual router 21 of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of the network interface card 13A of the server but also a virtual network identifier such as a VxLAN tag or Multiprotocol Label Switching (MPLS) label that identifies one of the virtual networks as well as the corresponding routing instance executed by virtual router 21. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. Hereinafter, description of virtual routers is made primarily with respect to virtual router 21A, but such description is relevant to other instances of virtual routers 21.

In some examples, for example, for each of the packets outbound from virtual network endpoints hosted by server 12A (e.g., any of pods 22A-22C), virtual router 21A attaches a tunnel encapsulation header indicating the virtual network for the packet to generate an encapsulated or "tunnel" packet, and virtual router 21A outputs the encapsulated packet via overlay tunnels for the virtual networks to a physical destination computing device, such as another one of servers 12. As used herein, virtual router 21A may execute the operations of a tunnel endpoint to encapsulate inner packets sourced by virtual network endpoints to generate tunnel packets and decapsulate tunnel packets to obtain inner packets for routing to other virtual network endpoints.

In some examples, virtual router 21A may be kernel-based and execute as part of the kernel of an operating system of server 12A.

In some examples, virtual router 21A may be a Data Plane Development Kit (DPDK)-enabled virtual router. In such examples, virtual router 21A uses DPDK as a data plane. In this mode, virtual router 21A runs as a user space application that is linked to the DPDK library (not shown). This is a performance version of a virtual router and is commonly used by telecommunications companies, where the VNFs are often DPDK-based applications. The performance of virtual router 21A as a DPDK virtual router can achieve ten times higher throughput than a virtual router operating as a kernel-based virtual router. The physical interface is used by DPDK's poll mode drivers (PMDs) instead of Linux kernel's interrupt-based drivers.

Servers 12 include and execute containerized routing protocol daemons 25A-25X (collectively, "cRPDs 25"). A containerized routing protocol daemon (CRPD) is a routing protocol process that is packaged as a container and may run in Linux-based environments. cRPD may be executed in the user space of the host as a containerized process. Thus, cRPD makes available the rich routing software pedigree of physical routers on Linux-based compute nodes, e.g., servers 12 in some cases. cRPD provides control plane functionality. This control plane is thus containerized. For example, cRPD 25A implements the control plane for a CNR 32A executed by server 12A.

Virtual routers 21, meanwhile, are the software entities that provide data plane functionality on servers 12. cRPD 25A may use the forwarding (or data) plane provided by the Linux kernel of server 12A for a kernel-based virtual router 21A. cRPD 25A may alternatively use a DPDK-enabled or SmartNIC-executed instance of virtual router 21. Virtual router 21A may work with an SDN controller (e.g., network controller 24) to create the overlay network by exchanging routes, configurations, and other data. Virtual router 21A may be containerized. In combination, the containerized cRPD and containerized virtual router may thus be a fully functional containerized, CNR 32A in some examples.

Computing infrastructure 8 implements an automation platform for automating deployment, scaling, and operations of virtual execution elements across servers 12 to provide virtualized infrastructure for executing application workloads and services. In some examples, the platform may be an orchestration system. In some cases, the orchestration system is a container orchestration system that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes (a container orchestration system), Docker swarm, Mesos/Marathon, OpenShift, OpenStack, VMware, and Amazon ECS.

Elements of the automation platform of computing infrastructure 8 include at least servers 12, orchestrator 23, and network controller 24. Containers may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily container hosting devices of a cluster. For example, the Kubernetes platform uses the terms "cluster master" and "minion nodes," while the Docker Swarm platform refers to cluster managers and cluster nodes. A Kubernetes cluster is an example of an orchestration system cluster.

Orchestrator 23 and network controller 24 may execute on separate computing devices, execute on the same computing device. Each of orchestrator 23 and network controller 24 may be a distributed application that executes on one or more computing devices. Orchestrator 23 and network controller 24 may implement respective master nodes for one or more clusters each having one or more minion nodes implemented by respective servers 12 (also referred to as "compute nodes").

In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator.

In general, orchestrator 23 controls the deployment, scaling, and operations of containers across clusters of servers 12 and providing computing infrastructure, which may include container-centric computing infrastructure. Orchestrator 23 and, in some cases, network controller 24 may implement respective cluster masters for one or more Kubernetes clusters. As an example, Kubernetes is a container management platform that provides portability across public and private clouds, each of which may provide virtualization infrastructure to the container management platform.

Kubernetes operates using a variety of Kubernetes objects-entities which represent a state of a Kubernetes cluster. Kubernetes objects may include any combination of names, namespaces, labels, annotations, field selectors, and recommended labels. For example, a Kubernetes cluster may include one or more "namespace" objects. Each namespace of a Kubernetes cluster is isolated from other namespaces of the Kubernetes cluster. Namespace objects may include at least one of organization, security, and performance of a Kubernetes cluster. As an example, a pod may be associated with a namespace, consequently associating the pod with characteristics (e.g., virtual networks) of the namespace. This feature may enable a plurality of newly-created pods to organize by associating the pods with a common set of characteristics. A namespace can be created according to namespace specification data that defines characteristics of the namespace, including a namespace name. In one example, a namespace might be named "Namespace A" and each newly-created pod may be associated with a set of characteristics denoted by "Namespace A." Additionally, Kubernetes includes a "default" namespace. If a newly-created pod does not specify a namespace, the newly-created pod may associate with the characteristics of the "default" namespace.

Namespaces may enable one Kubernetes cluster to be used by multiple users, teams of users, or a single user with multiple applications. Additionally, each user, team of users, or application may be isolated within a namespace from every other user of the cluster. Consequently, each user of a Kubernetes cluster within a namespace operates as if it were the sole user of the Kubernetes cluster. Multiple virtual networks may be associated with a single namespace. As such, a pod that belongs to a particular namespace has the ability to access each virtual network of the virtual networks that is associated with the namespace, including other pods that serve as virtual network endpoints of the group of virtual networks.

In one example, pod 22A is a Kubernetes pod and an example of a virtual network endpoint. A pod is a group of one or more logically-related containers (not shown in FIG. 1), the shared storage for the containers, and options on how to run the containers. Where instantiated for execution, a pod may alternatively be referred to as a "pod replica." Each container of pod 22A is an example of a virtual execution element. Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Server 12A includes a container platform 19A for running containerized applications, such as those of pod 22. Container platform 19A receives requests from orchestrator 23 to obtain and host, in server 12A, containers. Container platform 19A obtains and executes the containers.

Container network interface (CNI) 17A configures virtual network interfaces for virtual network endpoints. The orchestrator 23 and container platform 19A use CNI 17A to manage networking for pods, including pods 22. For example, CNI 17A creates virtual network interfaces to connect pods 22 to virtual router 21A and enables containers of such pods to communicate, via the virtual network interfaces, to other virtual network endpoints over the virtual networks. CNI 17A may, for example, insert a virtual network interface for a virtual network into the network namespace for containers in pod 22A and configure (or request to configure) the virtual network interface for the virtual network in virtual router 21A such that virtual router 21A is configured to send packets received from the virtual network via the virtual network interface to containers of pod 22A and to send packets received via the virtual network interface from containers of pod 22A on the virtual network. CNI 17A may assign a network address (e.g., a virtual IP address for the virtual network) and may set up routes for the virtual network interface. In Kubernetes, by default all pods can communicate with all other pods without using network address translation (NAT). In some cases, the orchestrator 23 and network controller 24 create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 23. When a user creates an isolated namespace for a pod, orchestrator 23 and network controller 24 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network.

CNI 17A may represent a library, a plugin, a module, a runtime, or other executable code for server 12A. CNI 17A may conform, at least in part, to the Container Network Interface (CNI) specification or the rkt Networking Proposal. CNI 17A may represent a Contrail, OpenContrail, Multus, Calico, cRPD, or other CNI. CNI 17A may alternatively be referred to as a network plugin or CNI plugin or CNI instance. Separate CNIs may be invoked by, e.g., a Multus CNI to establish different virtual network interfaces for pod 22.

CNI 17A may be invoked by orchestrator 23. For purposes of the CNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g., a router). Containers can be conceptually added to or removed from one or more networks. The CNI specification specifies a number of considerations for a conforming plugin ("CNI plugin").

By adopting a Kubernetes CNI framework in some examples, CNR 32A may mitigate the traditional operational overhead incurred when using a containerized appliance rather than its physical counterpart. By exposing the appropriate device interfaces, CNR 32A may normalize the operational model of the virtual appliance to the physical appliance, eradicating the barrier to adoption within the operator's network operations environment. CNR 32A (and more specifically the interface to cRPD 25A) may present a familiar routing appliance look-and-feel to any trained operations team. CNR 32A has similar features and capabilities, and a similar operational model as a hardware-based platform. Likewise, a domain-controller can in some cases use the protocols that it uses with any other router to communicate with and control CNR 32A, for example Netconf/OpenConfig, gRPC, Path Computation Element Protocol (PCEP), or other interfaces.

CNR 32A is effectively a virtualized router and may participate in IS-IS, Open Shortest Path First (OSPF), BGP, and/or other interior or exterior routing protocols and exchange routing protocol messages with other routers, whether physical routers or CNRs 32B-32X (CNRs 32A-32X are referred to herein collectively as "CNRs 32") residing on other hosts. In addition, MPLS may be used, often based on Segment Routing (SR). The reason for this is two-fold: to allow Traffic Engineering if needed, and to underpin multi-tenancy, by using VPNs, such as MPLS-based Layer 3 VPNs or EVPNs.

Each of Pods 22 includes one or more containers. In some examples, one or more of pods 22 include a containerized DPDK workload that is designed to use DPDK to accelerate packet processing, e.g., by exchanging data with other components using DPDK libraries. Virtual router 21 may execute as a containerized DPDK workload in some examples.

Pods 22 are each configured with one or more virtual network interfaces (VNIs) 26 for sending and receiving packets with virtual router 21. Virtual network interfaces 26 may be a default interface for pods 22. Pods 22 may implement virtual network interface 26 as an Ethernet interface (e.g., named "eth0") while virtual router 21 may implement virtual network interfaces 26 as tap interfaces, virtio-user interfaces, or other type of interface. Although described with respect to pods, VNIs 26 may be attached to other virtual execution elements such as virtual machines. A virtual network interface may alternatively be referred to as a Virtual Machine Interface (VMI) even if referring to a VNI for a Pod/container.

Pods 22 and virtual router 21 exchange data packets using virtual network interfaces 26. Virtual network interface 26 may be a DPDK interface. Pods 22 and virtual router 21 may set up virtual network interface 26 using vhost. Pods 22 may operate according to an aggregation model. Pods 22 may use a virtual device, such as a virtio device with a vhost-user adapter, for user space container inter-process communication for virtual network interface 26. Description hereinafter is made primarily with respect to pod 22A but can apply to other pods 22 or other virtual execution elements.

CNI 17A may configure, for pod 22A, in conjunction with one or more other components shown in FIG. 1, a virtual network interface 26. Any of the containers of pod 22A may utilize, i.e., share, the virtual network interface(s) 26 of pod 22A.

In some examples, cRPD 25A includes default VRF 28 (illustrated as "D. VRF 28") and VRFs 29A-29B (collectively, "VRFs 29"). Default VRF 28 stores the global routing table. cRPD 25A programs forwarding information derived from routing tables of VRFs 29 as forwarding tables into virtual router 21A. In this way, virtual router 21A implements the VPNs for VRFs 29, which are illustrated as included in both virtual router 21A and cRPD 25A.

In some examples, cRPD 25A is configured to operate in host network mode, also referred to as native networking. cRPD 25A therefore uses the network namespace and IP address(es) of its host, i.e., server 12A. cRPD 25A has visibility and access to network interfaces 35A-35B of NIC 13A, which are inserted into default VRF 28 and considered by CRPD 25A as core-facing interfaces. Interfaces 35A-35B are connected to switch fabric 14 and may be Ethernet interfaces. Interfaces 35 are considered and used as core-facing interfaces by cRPD 25A for providing VPNs, for interfaces 35 may be used to transport VPN service traffic over a layer 3 network made up of one or more of switch fabric 14, IP fabric 20, service provider network 7, or public network 15.

In the example server 12A of FIG. 1, pods 22 are virtual network endpoints in one or more virtual networks. Orchestrator 23 may store or otherwise manage configuration data for application deployments that specifies a virtual network and specifies that a pod 22 (or the one or more containers therein) is a virtual network endpoint of the virtual network. Orchestrator 23 may receive the configuration data from a user, operator/administrator, or other machine system, for instance.

As part of the process of creating pod 22A, for instance, orchestrator 23 requests that network controller 24 create respective virtual network interfaces for one or more virtual networks (indicated in the configuration data). Pod 22A may have a different virtual network interface for each virtual network to which it belongs. For example, virtual network interface 26 may be a virtual network interface for a particular virtual network. Additional virtual network interfaces (not shown) may be configured for other virtual networks. Network controller 24 processes the request to generate interface configuration data for virtual network interfaces for the pod 22A. Interface configuration data may include a container or pod unique identifier and a list or other data structure specifying, for each of the virtual network interfaces, network configuration data for configuring the virtual network interface. Network configuration data for a virtual network interface may include a network name, assigned virtual network address, MAC address, and/or domain name server values. An example of interface configuration data in JavaScript Object Notation (JSON) format is below.

In some examples, a Pod can have multiple interfaces to different cRPD VRFs 29, e.g., one for management traffic, another for data traffic. In FIG. 1, pod 22B may use VRF 29B for management traffic and VRF 29A for data traffic, for instance.

A pod 22, e.g., pod 22A, might be connected to some physical interfaces where pod 22 learns IP addresses of other devices, such as User Equipment where the pod is implementing a mobile network gateway or a customer network subnet where the pod is implementing a CE router or gateway. In some examples, to advertise these IP addresses into the network, pod 22A treats the virtual network interface 26 with a VRF 29 as an IP link and advertises routes for these IP addresses to cRPD 25A. CRPD 25A can then advertise reachability for these IP addresses through cRPD 25A and pod 22A as a next hop, again conforming to a VPN service model. cRPD 25A programs virtual router 21 with corresponding forwarding information derived from the VRFs 29 and default VRF 28, and virtual router 21 forwarding VPN traffic according to the VPN service model to implement the VPNs.

CRPD 25A may apply many different types of overlay networks/VPNs, including L3VPN or EVPN (Type-2/Type-5), using a variety of underlay tunneling types, including MPLS, SR-MPLS, SRv6, MPLSoUDP, MPLSoGRE, or IP-in-IP, for example.

CNI 17A may configure, for pod 22*s*, in conjunction with one or more other components shown in FIG. 1, virtual network interfaces 26. Any of the containers of a pod 22 may utilize, i.e., share, any virtual network interface of the pod. Orchestrator 23 may store or otherwise manage virtual network interface configuration data for application deployments. Orchestrator 23 may receive specification for containerized applications ("pod specifications" in the context of Kubernetes) and network attachment definitions from a user, operator/administrator, or other machine system, for instance, and network controller 24 may derive the configuration data from this information for configuring VRFs 29 and default VRF 28; and configuring virtual network interfaces 26.

A conventional CNI plugin is invoked by a container platform/runtime, receives an Add command from the container platform to add a container to a single virtual network, and such a plugin may subsequently be invoked to receive a Del(ete) command from the container/runtime and remove the container from the virtual network. The term "invoke" may refer to the instantiation, as executable code, of a software component or module in memory for execution by processing circuitry.

In the example computing infrastructure of FIG. 1, Network controller 24 is a cloud-native, distributed network controller for SDN that is implemented using one or more configuration nodes 36 and one or more control nodes 37. Each of configuration nodes 36 may itself be implemented using one or more cloud-native, component microservices. Each of control nodes 37 may itself be implemented using one or more cloud-native, component microservices.

Network controller 24 may be multi-tenant aware and support multi-tenancy for orchestration platforms. For example, network controller 24 may support Kubernetes Role Based Access Control (RBAC) constructs, local identity access management (IAM) and external IAM integrations. Network controller 24 may also support Kubernetes-defined networking constructs and advanced networking features like virtual networking, BGPaaS, networking policies, service chaining and other telco features. Network controller 24 may support network isolation using virtual network constructs and support layer 3 networking.

To interconnect multiple virtual networks, network controller 24 may use (and configure in the underlay and/or virtual routers 21) network policies, referred to as Virtual Network Policy (VNP) and alternatively referred to herein as Virtual Network Router or Virtual Network Topology. The VNP defines connectivity policy between virtual networks. A single network controller 24 may support multiple Kubernetes clusters, and VNP thus allows connecting multiple virtual networks in a namespace, Kubernetes cluster and across Kubernetes clusters. VNP may also extend to support virtual network connectivity across multiple instances of network controller 24.

Network controller 24 may enable multi layers of security using network policies. The Kubernetes default behavior is for pods to communicate with one another. In order to apply network security policies, the SDN architecture implemented by network controller 24 and virtual router 21 may operate as a CNI for Kubernetes through CNI 17A. For layer 3, isolation occurs at the network level and virtual networks operate at L3. Virtual networks are connected by policy. The Kubernetes native network policy provides security at layer 4. The SDN architecture may support Kubernetes network policies. Kubernetes network policy operates at the Kubernetes namespace boundary. The SDN architecture may add custom resources for enhanced network policies. The SDN architecture may support application-based security. (These security policies can in some cases be based upon metatags to apply granular security policy in an extensible manner.) For layer 4+, the SDN architecture may in some examples support integration with containerized security devices and/or Istio and may provide encryption support.

CNRs, such as CNR 32A, are described in further detail in U.S. Patent Publication 2022-0279420 A1, published on Sep. 1, 2022, entitled "CONTAINERIZED ROUTER WITH VIRTUAL NETWORKING", which is incorporated herein by reference in its entirety.

In some examples, a containerized router operating within a public cloud environment may provide routing control plane functionality for VPC workloads reachable via VPC gateways. The containerized router may execute a routing protocol to learn routes associated with the VPC workloads and may program a VPC route table in a VPC gateway device to cause the VPC gateway device to route traffic towards the containerized router for further routing. Such traffic may include traffic from one or more containers (also referred to as pods). Such an arrangement may be beneficial as the pods and on-prem routers may include border gateway protocol (BGP) speakers, but the VPC gateway may not be BGP-enabled and therefore unable to process BGP advertisements or BGP-advertised routing information to determine how to route overlay traffic sourced by or destined to workloads in a VPC, such as BGP traffic.

In some examples, redundant containerized routers may be used in a public cloud environment. The redundant containerized routers may connect with each other, for example, via a virtual router redundancy protocol (VRRP) session. A first containerized router of the redundant containerized routers may determine, via the VRRP session, that the first containerized router is an active containerized router. The first containerized router may connect to a VPC gateway and program a VPC route table in a VPC gateway.

Additional description with respect to containerized routers and VPCs may be found in U.S. application Ser. No. 18/345,707, filed Jun. 30, 2023 and entitled "CONTAINERIZED VIRTUAL ROUTER FOR USE WITH A VIRTUAL PRIVATE CLOUD;" and U.S. application Ser. No. 18/345,737, filed Jun. 30, 2023 and entitled "REDUNDANT CONTAINERIZED VIRTUAL ROUTERS FOR USE WITH A VIRTUAL PRIVATE CLOUD;" the entire contents of each of which is herein incorporated by reference.

In accordance with the techniques of the disclosure, network controller 24 includes VPC connectivity selector 38. As described in more detail below with respect to FIGS. 5, 6A-6B, and 7, VPC connectivity selector 38 provides interconnectivity selection for an Application VPC and a transit VPC (not depicted in FIG. 1). An Application VPC hosts application instances for one or more clients, the application instances executed by one or more computing devices, such as servers 12. A Transit VPC comprises one or more network devices (e.g., one or more routers or switches, such as switches 16, 18) that interconnect the Application VPC with a remote network, such as public network 15, service provider network 7, or a network within a geographically-separate data center. In some examples, the Application VPC and Transit VPC may be executed by one or more pods 22 of servers 12.

A plurality of paths interconnect the Application VPC and the transit VPC. For example, a first path (depicted below in FIG. 6A) may comprise a GWLBE of the Application VPC and a GWLB of the transit VPC. A second path (depicted below in FIG. 6B) may comprise a transit gateway that provides interconnectivity between the Application VPC and the transit VPC. In addition, other paths, of numerous different types, may exist to interconnect the Application VPC and the transit VPC.

VPC connectivity selector 38 receives, from routers of the transit VPC, metrics for network traffic exchanged between the Application VPC and the transit VPC for the application instances. VPC connectivity selector 38 selects, based at least in part on the received metrics, one of the first path and the second path. In some examples, the selected path is the one of the first path and the second path having a lowest cost to operate. For example, the selected path may be a cheapest option given the bandwidth consumed by the application instances and a number of hops traversed by network traffic associated with the application instances. In some examples, the selected path is the one of the first path and the second path having a highest performance. For example, the selected path may the one of the first path and the second path having a lowest latency. As another example, the selected path may the one of the first path and the second path selected based on multiple metrics, such as latency, bandwidth, jitter, etc.

VPC connectivity selector 38 configures the Application VPC to forward subsequent network traffic for the application instances via the selected path. In some examples, VPC connectivity selector 38 configures the Application VPC to forward subsequent network traffic for the application instances via the selected path by programming the selected path within a routing base of Application VPC.

Figure 2:
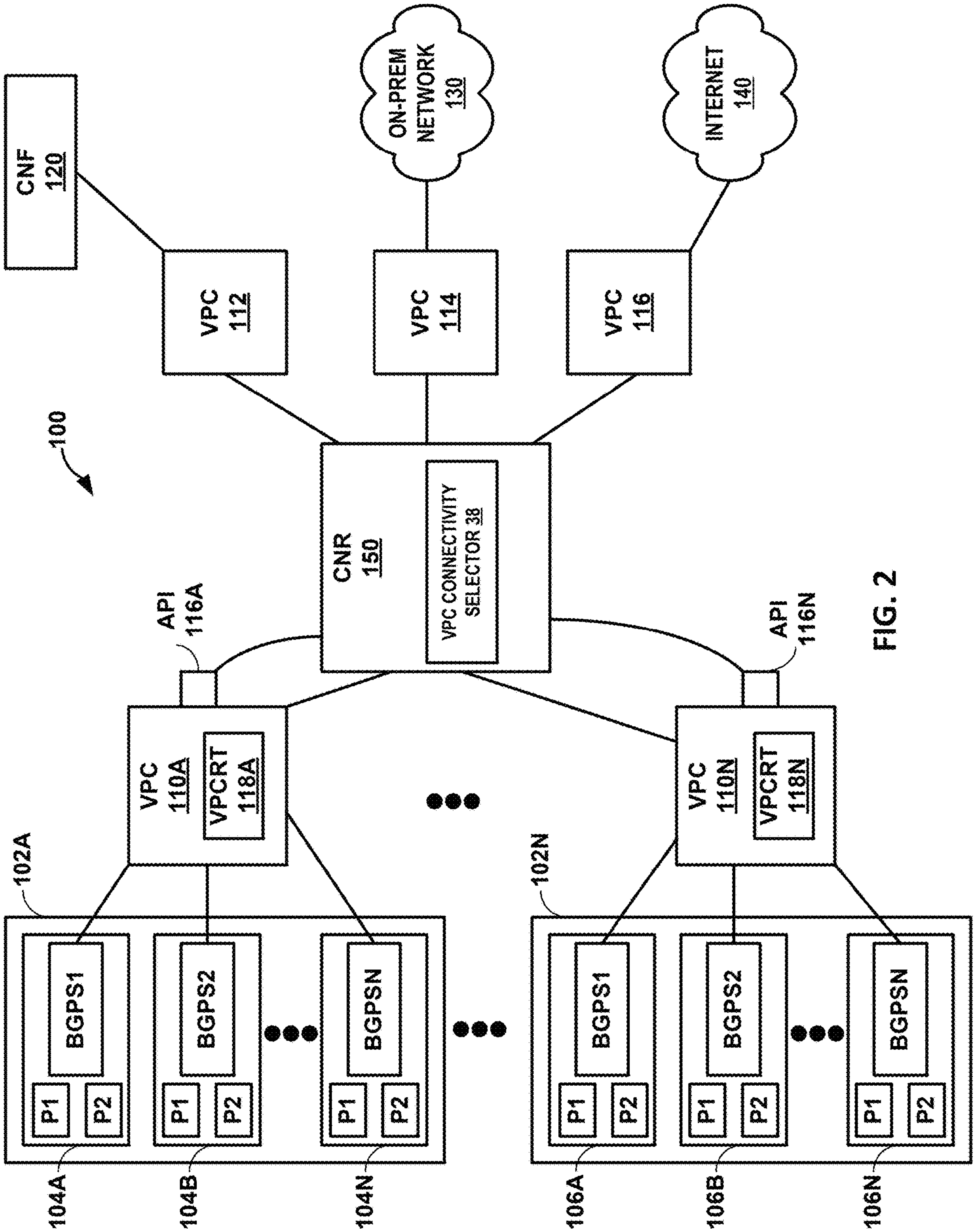
FIG. 2 is a block diagram of an example cloud computing environment including a cloud-native router (CNR) which programs VPC route tables for VPC gateways according to one or more aspects of this disclosure.

FIG. 2 is a block diagram of an example cloud computing environment including a CNR which programs VPC route tables for VPC gateways according to one or more aspects of this disclosure. Cloud computing environment 100 may be an example of one or more of data center(s) 10 of FIG. 1. Cloud computing environment 100 may be configured to provide VPC services to customers of an operator of cloud computing environment 100. A VPC may operate as an extension of an on-prem network (e.g., on-prem network 130) of a customer of the operator of cloud computing environment 100 or operate as a virtual network that is similar to a traditional (or physical) network of the customer of the operator of cloud computing environment 100. A VPC may include one of more subnets, each with its own range of IP addresses, and one or more gateways, which may be referred to herein as VPC gateways. A gateway may be a device (physical or virtual) that connects a VPC to other networks. For example, an Internet gateway (e.g., VPC gateway 116) may connect a VPC to Internet 140.

Cloud computing environment 100 may include CNR 150, VPC gateways 110A-110N (collectively VPC gateways 110) which may provide access to clusters 102A-102N (collectively clusters 102). VPC gateways 110 may be examples of VPC gateway 7 of FIG. 1. Cluster 102A may include a plurality of worker (compute) nodes 104A-104N, which may include Kubernetes worker nodes. Similarly, cluster 102N may include a plurality of worker nodes 106A-106N. Each of worker nodes 104A-104N and worker nodes 106A-106N may include, BGP speakers (e.g., BGPS1-BGPSN) and one or more pods, such as pods P1 and P2. In some examples, pods P1 and pods P2 may not be BGP enabled. As shown in FIG. 2, pods P1 represent pods of a first service and pods P2 represent pods of a second service. Pods P1 and P2 may be a part of a same subnet or a different subnet. Each service may have a unique IP address, which may be a virtual IP or service IP. IP addresses for pods P1 may be drawn from the service subnet for the first service. A given worker node may include pods for one or more services. Clusters 102 may represent clusters of a VPC which may be executing as an extension of another network, such as on-prem network 130.

BGP speakers BGPS1-BGPSN, which map be pods, such as pods of cluster 102A, may know or become aware of the IP addresses associated with pods P1 and P2. In some examples, BGP speakers BGPS1-BGPSN may be a part of a CNI which allocates IP addresses to pods P1 and P2, and would therefore know the IP addresses of pods P1 and P2. In some examples, BGP speakers BGPS1-BGPSN may learn the IP addresses, for example, through interactions with Kubernetes elements and may advertise such IP addresses via a data protocol, such as BGP. However, as described in further detail below, VPC gateways 110 may be incapable of processing routing protocol (e.g., BGP) messages from BGP speakers BGPS1-BGPSN and therefore unable to learn routes to pods P1 or P2.

Cloud computing environment 100 may also include VPC gateway 112, VPC gateway 114, and VPC gateway 116. VPC gateway 112 may provide access to cloud-native network function (CNF) 120. CNF 120 may be a software service that provides network functions to cloud computing environment 100. In some examples, CNF 120 may be implemented via pods or containers. VPC gateway 114 may provide access to on-prem network 130, and VPC gateway 116 which may provide access to Internet 140. While not shown in FIG. 2, cloud computing environment 100 may include additional devices (which may be physical or virtual) which may be used to access or interact with other networks or network devices, not included in FIG. 2, such as additional on-prem networks. VPC gateway 116 may function as an Internet gateway, providing access to Internet 140 to the various clusters 102 of cloud computing environment 100. VPC gateway 114 may function as a gateway to on-prem network 130 providing access between on-prem network 130 and cluster(s) 102 of a VPC of on-prem network 130. In some examples, each of clusters 102, VPCs 110, and CNR 150 may function as layer 3 routers, such that no tunneling is needed between these devices. For example, CNR 150 may employ MAC learning to direct traffic from, for example, on-prem network 130 to clusters 102.

While cloud computing environment 100 may have VPCs including VPC gateways 110, such VPC gateways may offer limited functionality due to limitations of underlying hardware platforms (e.g., in terms of scale, functionality, or the like) or software implementations (e.g., in terms of equal-cost multipath routing (ECMP), overlays, signaling, protocols, or the like), scale (e.g., in terms of a limited number of routes, tables/instances, number of protocol sessions such as BGP, or the like) for workloads deployed on those environments. In some examples, VPC gateways 110 may not operate using conventional routing protocols and/or may require use of custom APIs and non-portable protocols. For example, the devices of cloud environment 100 may not be able to use any standard protocols to speak with VPC gateways 110. VPC gateways 110 may not be aware of IP addresses to on-prem network 130. As such, BGP speakers, such as BGPS1 of workload 104A may be unable to advertise workload 104A or pods P1 and P2 of workload 104A to VPC gateway 110A.

To address this issue, CNR 150 may use APIs to program VPC route tables 118 of VPC gateways 110. Such programming may not introduce new tunneling between VPCs 110 and CNR 150, but instead instruct VPC gateways 110 how to forward packets (e.g., towards workloads 104 and 106) using a same IP header information as used by CNR 150. In some respects, CNR 150 may treat VPC gateways 110 as forwarding planes-instructing VPC gateways 110 how to forward packets from different routes learned by CNR 150 via routing protocol messages advertised, e.g., by BGPS1-BGPSN of clusters 102. In such respects, CNR 150 may be viewed as a control plane for VPC gateways 110, as CNR 150 may program VPC route tables 118 of VPCs 110. When programing VPC route tables 118, CNR 150 may use a policy engine of cRPD 25A (FIG. 1) and apply a different route policy for each VPC route table.

For example, CNR 150 may utilize a routing policy as a filter to affect routing of packets. The routing policy may be based on both a source address and a destination address. As such, packets may be routed within an appropriate VPN, e.g., of a VPC, such as in the case where on-prem network 130 includes multiple tenants.

In some examples, CNR 150 abstracts and hides all the VPC network details from the hosted services, while also making the solution portable across different cloud environments and as well provide easy migration to on-prem environments. CNR 150 may provide this either by using network overlays or by directly interacting with cloud network elements.

For example, CNR 150 may interact with the cloud environment underlay, learning underlay network topology and then distribute routes into the underlay to provide seamless connectivity between applications deployed in the cloud environment and on-prem or another cloud environment (e.g., a Hybrid Cloud).

For example, CNR 150 may dynamically establish (BGP) routing adjacencies on worker nodes or pods and distribute routing information into the cloud environment underlay and/or advertise to remote BGP peers. These prefixes are not (automatically) learned by VPC gateways 110, but are needed, in some cases, to enable traffic forwarding, for example, from VPC gateways 110 to, for example, on-prem network 130.

When an IP router is deployed in cloud environment having VPCs, for most scenarios it may not be able to provide routing because such cloud environments have their own Layer-3 based network (underlay) VPC infrastructure which prevents establishing routing adjacencies using protocols such as IS-IS, OSPF due to lack of support for multicast and broadcast traffic. This disclosure describes a CNR that provides routing functionality in a cloud environment having one or more VPCs. While shown separately, in some examples, CNR 150 may be implemented in a cluster of clusters 102.

In the example of FIG. 2, CNR 150 programs VPC route tables 118 (illustrated as VPCRT 118A-118N in FIG. 1) such that VPCs gateways 110 forward traffic to CNR 150, whereas a standard router would simply program its own forwarding information base (FIB) to forward incoming traffic away from itself. As CNR 150 may learn routes to, e.g., on-prem network 130, CNR may then route traffic destined to on-prem network 130 from VPC gateways 110 to on-prem network 130 after receiving the traffic from VPC gateways 110.

CNR 150 may program VPC route tables 118 of VPCs 110 using an API of VPC(s) 110. CNR 150 may program a plurality of VPC tables 118, each having a respective (e.g., different) set of routes and next-hops. In some examples, CNR 150 may map cRPD routes and interfaces to VPC route tables 118 and interfaces based on operator defined tags. In some examples, an operator may define route tables, next-hops, route selection criteria, or the like, through route policies, which may be applied by CNR 150. An administrator could alternatively statically program the VPC route tables, but such a practice is not scalable and does not take advantage of the high scalability of a VPC for a customer.

For example, a VPC route table (e.g., VPC route table 118A) may include an indication that for a particular IP address, the next-hop IP address should be zero or a worker node (e.g., worker node 104A). cRPD 25A may use an interface ID, for example a virtual network interface on a VPC gateway and an interface name on CNR 150.

VPCs 110 may know the IP addresses of worker nodes 104 and 106, but not know the IP addresses assigned to the application pods (e.g., P1 and P2) within the worker nodes 104 and 106. For example, VPCs 110 may not know how to deliver packets from pods P1 and P2 to on-prem network 130 or vice versa.

An administrator may determine different route policies to be used by CNR 150 to program each of VPC route tables 118. For example, a policy may be used to determine which routes to program into a VPC route table. As such, a policy may act as a filter, such that a given VPC route table (e.g., VPC route table 118A) may include a subset of available routes.

In some examples, there may be overlap in destination IP addresses between different intended destinations. In such a case, using policy-based routing, CNR 150 may use both a source IP address and a destination IP address to categorize a packet into different VPNs to route packets from all pods sharing a same interface and delivering packets to same VPC such that packets meant for on-prem network 130 are sent to VPC 114 and not a VPC associated with another on-prem network.

In some examples, a BGP speaker may be a CNI that assigns pod IP addresses so the BGP speaker (e.g., BGPS1) knows the IP addresses for the associated pods (P1 and P2 of worker node 104A). In some examples, a BGP speaker may be a plug-in.

Some wireless service providers, when expanding their existing infrastructure to accommodate 5G, may desire to move some of their core network into the public cloud. For example, 5G's cloud native core functions like unified data management (UDM), network slice selection function (NSSF), and network repository function (NRF) can be containerized, and moved into the public cloud. Because wireless service providers may provide slicing functions and offer slices on the basis of factors like functionality, performance, User Equipment (UE) groups, etc., these CNFs should be elastically scaled up or down in a public cloud environment dynamically using load balancer services. Service providers also can take the advantage of the inherent redundancy capabilities provided by the public cloud and so distribute their functions across different geographical zones in an active-standby mode. Service providers expect seamless connectivity, low latency, and high throughput from their on-prem data center to the core functions running in the cloud. A major requirement for service providers having geographically distributed networks may be seamless switchover in case of natural calamities/failures to a different geographical zone. Traditional public cloud offerings may not support the network services required for such a use case. As such, it may be desirable to provide a cloud native software router to address these requirements.

CNR 150 may utilize a DPDK vrouter, as its dataplane to accelerate the packets processed per second (PPS) to deliver the required packet performance in cloud environments.

CNR 150 may be used to extend a 5G core infrastructure running on-premises (e.g., on-prem network 130) to, for example, VPC 110A. In the 5G example, different services like NSSF, NRF and UDM, each with their own service IP addresses, may be run in an EKS cluster (e.g., cluster 102A), each in their own VRFs (For example, SIG VRF, OAM VRF), and CNR 150 may provide seamless communication with the VRF counterparts like CUs running in on-prem network 130, for example, with full isolation. Cluster 102A may include a nodegroup with autoscaling of maximum and minimum size as 2, for example. The 5G CNF pods and CNR 150 may be run in different clusters. For example, the 5G CNF pods may be run in cluster 102A while CNR 150 may be run in another cluster of clusters 102A-102N. The service IP addresses may be cluster endpoints accessible only inside a VPC. Cluster networking may be provided by a cloud service provider VPC container networking interface (CNI) plugin. The CNI plugin allows the Kubernetes pods to have a same IP address as the Kubernetes pods have on the VPC network. All containers inside the pod that share a network namespace can communicate with each other using ports.

To attract traffic from these 5G CNFs and on-premises CNFs, CNR 150 may, via VPC APIs, program the internal and external VPC route tables. For example, CNR 150 may include a full BGP stack by which, CNR 150 peers with the 5G CNFs, a transit gateway (TGW) (shown in FIG. 3), and any on-premises edge gateway running in cloud computing environment 100 to exchange routes. The 5G CNFs may have BGP capability to advertise the associated service virtual IP addresses towards CNR 150. In some examples, CNR 150 includes a BGP auto-configuration function where CNR 150 automatically sets up BGP sessions when a new CNF workload is orchestrated.

In some examples, CNR 150 may execute all or a portion of VPC connectivity selector 38 of FIG. 1. As described above, VPC connectivity selector 38 may program the internal and external VPC route tables of, for example, VPC 110A, so as to configure VPC 110A to use a particular path. For example, VPC connectivity selector 38 may program the internal and external VPC route tables to use a first path that comprises a GWLBE of an Application VPC and a GWLB of a transit VPC, or a second path that comprises a transit gateway that provides interconnectivity between the Application VPC and the transit VPC.

Figure 3:
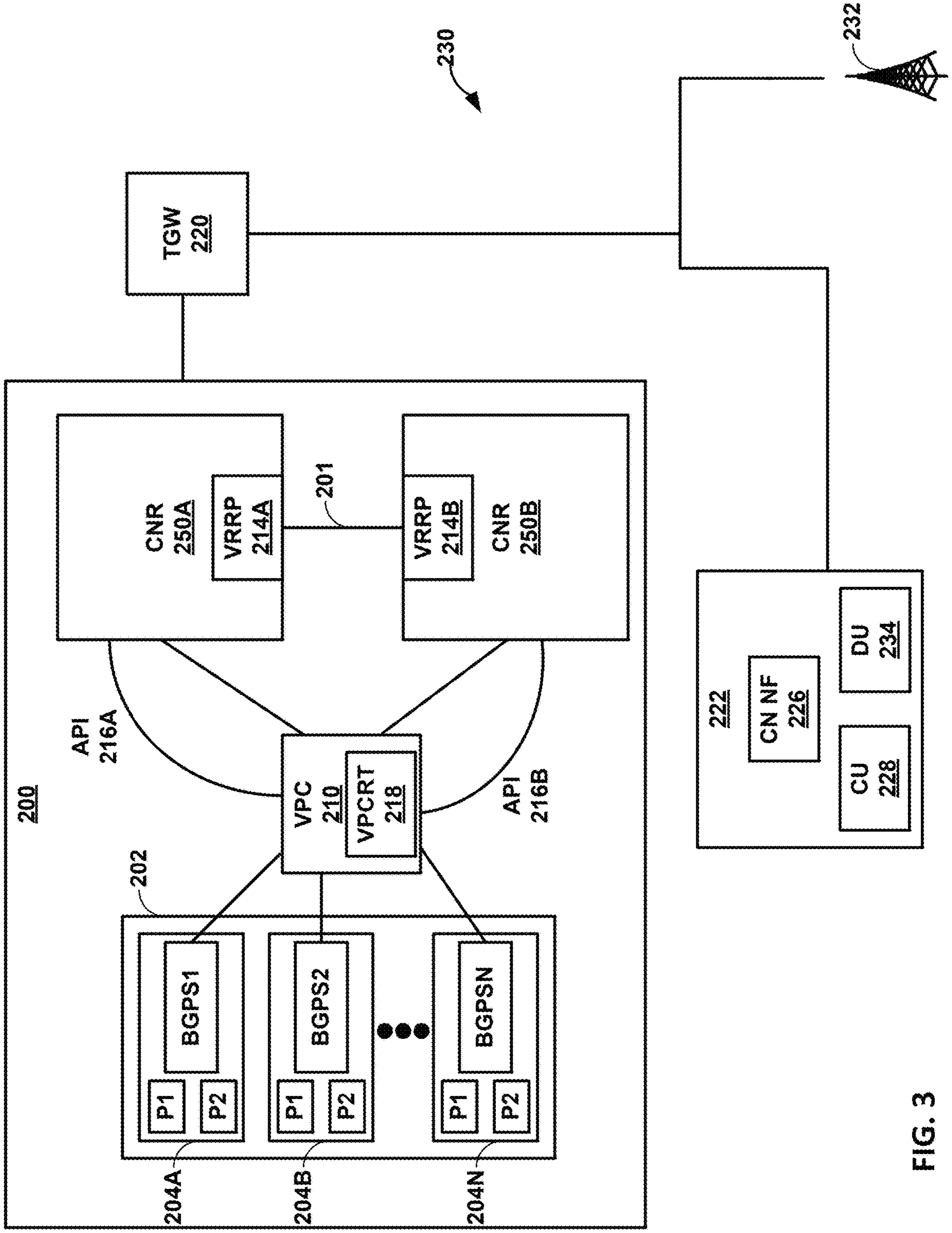
FIG. 3 is a block diagram of an example cloud computing environment according to one or more aspects of this disclosure.

FIG. 3 is a block diagram of an example cloud computing environment according to one or more aspects of this disclosure. Cloud computing environment 200 may be similar to cloud computing environment 100, but include redundant CNRs (CNR 250A and CNR 250B), which may be examples of CNR 150 of FIG. 2. In the example of FIG. 3, cloud computing environment 200 is shown coupled to an on-prem network 330, which may be an example of on-prem network 130 of FIG. 2. On-prem network 330 may be a wireless wide area network, such as a 5G network.

CNR 250A and CNR 250B may include virtual router redundancy protocol (VRRP) components 214A and 214B, respectively, which may be operable to establish a VRRP session 201 between CNR 250A and CNR 250B. In some examples, one or more of VRRP components 214A or 214B may be implemented as a pod, such as pods P1 or P2. To determine which of CNR 250A and CNR 250B should be the active node and which should be the standby node, CNR 250A and CNR 250B may run VRRP session 201. VRRP is a protocol which may be used to provide redundancy in a network. VRRP session 201 may elect one of CNR 250A or CNR 250B as an active node (sometimes referred to as a master node) and the other of CNR 250A or CNR 250B as a standby node (sometimes referred to as a backup node). The active CNR is responsible for operating as a CNR, similar to CNR 150 of FIG. 2, while the standby CNR remains available for assuming the functions of the active CNR should an issue occur with the active CNR or links thereto which prevent the active CNR from operating as intended. In some examples, VRRP session 201 may include a unicast VRRP session. Private cloud environments having VPCs, may not support L2-based VRRP, as they may not support IP broadcast and/or multicast traffic. As such VRRP session 201 may be a unicast VRRP session.

In some examples, CNR 250A and CNR 250B may share a virtual IP address on the interfaces facing worker nodes 204 (e.g., the interface with VPC 210). In some examples, the shared virtual IP address will only be used by the active node of CNR 250A and CNR 250B. The active node may forward traffic to/from worker nodes 204, while the standby node may not. Additionally, the active node may update VPC route table 218, which the standby may not. In this manner, VPCs interfacing with CNR 250A and CNR 250B (e.g., VPC 210) may only forward traffic to the active node.

The active CNR node may have an L2 MAC address which may be different than an L2 MAC address of the standby CNR node. The active CNR node may advertise the L2 MAC address of the active CNR node, while the standby CNR node may not advertise the L2 MAC address of the standby CNR node. For example, if CNR 250A is the active node, CNR 250A may advertise the L2 MAC address for CNR 250A, while the standby node, CNR 250B, may not advertise the L2 MAC address for CNR 250B.

For example, CNR 250A may continue operating as the active node and CNR 250B as the standby node until a failure of CNR 250A is detected. When the failure of CNR 250A is detected via VRRP 201, CNR 250B (the standby node) will become the active node. In such a case, in order to continue attracting traffic to the active node (which has now changed from CNR 250A to CNR 250B), CNR 250B may learn routes from neighboring devices and a routing agent application of CNR 250B may update VPC route table 218 to update the forwarding next-hop to be CNR 250B (rather than CNR 250A), and a routing agent application of CNR 250A may cease updating VPC route table 218. As such, traffic from the pods of workers 204 may be forwarded by VPC 210 to CNR 250B, the new active node. For example, in an L2 based network segment, CNR 250B may use gratuitous ARP to update an ARP entry corresponding to the virtual IP address such that traffic is now forwarded to the CNR 250B, the new active VRRP master.

CNR 250B may begin advertising CNR 250B's L2 MAC address, while CNR 250A may cease advertising CNR 250A's L2 MAC address. In this manner, traffic from, for example, TGW 220, may be directed to CNR 250B, rather than CNR 250A.

In some examples, VRRP mastership status may be used to modify a BGP route attribute, such as local-preference (local-pref) (I-BGP) or multi exit discriminator (MED) (e-BGP), such that a remote, on-prem device (virtual or physical), such as a BGP peer, would prefer CNR 250B (the VRRP active node), as an egress PE, over CNR 250A.

Upstream routers, such as TGW 220, may have a virtual IP address which may be used as forwarding next hop IP address by the active CNR. In some examples, both CNR 250A and CNR 250B (both the active node and the standby node) advertise BGP prefixes to on-prem network 330 to establish BGP sessions with BGP peers in on-prem network 330. In some examples, BGP speakers (BGPS1-BGPSN) of worker nodes 204 advertise BGP prefixes to both CNR 250A and CNR 250B.

In some examples, worker nodes 204 may use the virtual IP address shared by CNR 250A and CNR 250B as the default route if the virtual IP address is in a same subnet as worker node. This approach would result in fewer updates to VPC route table 218, but would require the active VRRP node to acquire the virtual IP address from the VPC infrastructure. In such an example, the virtual IP address should be known to all the worker nodes.

In the example of FIG. 3, worker nodes 204 are part of cluster 302 which may host 5G Core core network functions (CNFs), such as NSSF, UDM, or the like, for a service provider associated with on-prem network 330. Each of these CNFs may have their own virtual IP address. In some examples, these services may be operated in different virtual routing and forwarding functions (VRFs) and include traffic isolation between such services. For example, there may be a virtual IP address for an operations, administration and maintenance (OAM) VRF (10.10.10.10/32) and another virtual IP address for a secure Internet gateway (SIG) VRF (10.10.11.10/32). Each worker of worker nodes 204 may have a BGP speaker of BGPS1-BGPsN, which may be used to peer with an active CNR of CNRs 250A and 250B, and advertise the virtual IP addresses.

In some examples, CNRs 250A and 250B may run on a cluster (not shown in FIG. 3), such as cluster 102N (FIG. 2). For example, such a cluster may have an auto-scale size of 2. One of CNRs 250A or 250B may be in an active mode, while the other of CNRs 250A or 250B may be in a standby mode to provide redundancy for the functions of the active CNR. In some examples, CNR 250A and CNR 250B may each be located in a different geography (such as where cloud computing environment 200 is a geographically dispersed cloud computing environment) to provide geographic redundancy. CNRs 250A and 250B may peer with TGW 220 to reach on-prem network 330, which may include a telecommunications data center 322, where core network, network function (CN NF 226), centralized unit (CU) 228, and/or distributed unit (DU) 234 may be located. It should be understood that on-prem network 330 may also include cellular radio/antenna 332.

In the example of FIG. 3, the active CNR may support multiple interfaces (e.g., up to 8) and can route traffic between these interfaces. For example, an Ethernet interface in CNR 250A and/or CNR 250B may be used to send traffic like http, https, or the like, towards worker nodes 204 for all the virtual IP addresses.

In some examples, CNR 250A and CNR 250B may include BGP auto-configuration, such that no new configuration needs to be added when new BGP speakers are spun up, such as BGPSN. In some examples, CNR 250A and CNR 250B may include bidirectional forwarding detection (BFD), which may be used to detect sub-second failures with respect to 5G workloads of worker nodes 204, and to re-route traffic. In some examples, CNR 250A and CNR 250B may utilize VRF-lite. For example, virtual routing domains with route leaking may be configured to route traffic across different VRFs. For example, prefixes in a SIG VRF and an OAM VRF may be leaked in an Ethernet interface. In some examples, CNR 250A and CNR 250B may support equal-cost multi-path (ECMP) routing. For example, new workers (e.g., worker node 104N) can be added or deleted on the fly without impacting existing flows. This may be referred to as flow affinity or flow stickiness. In some examples, CNR 250A and CNR 250B may be configured to interact with VPC gateway 210 via APIs, such as API 216A and 216B, which are programmed to populate external and internal routing tables (e.g., route table 218) based on BGP advertisements (e.g., from BGP speakers BGPS1-BGPSN) to attract traffic towards an active one of CNR 250A or CNR 250B.

In some examples, CNR 250A and CNR 250B may provide for asymmetric routing. For optimization purposes and cost saving, there may be some flows from the active CNR towards worker nodes 204, but the reverse flows from worker nodes 204 may be routed directly from VPC gateway 210. In some examples, to support the active-standby switchover between CNR 250A and CNR 250B, CNR 250A and CNR 250B may use one or more protocols, like VRRP. In some examples, because most of public clouds do not support multicast or broadcast, CNR 250A and CNR 250B may use unicast VRRP. In some examples, CNR 250A and CNR 250B may support tunnels, such as MPLS-over-UDP tunnels (MPLSoUDP). For example, CNR 250A and CNR 250B may utilize MPLSoUDP encapsulation to tunnel the traffic towards on-prem network 330. In some examples, CNR 250A and CNR 250B may provide control plane features, such as EVPN-VXLAN.

Figure 4:
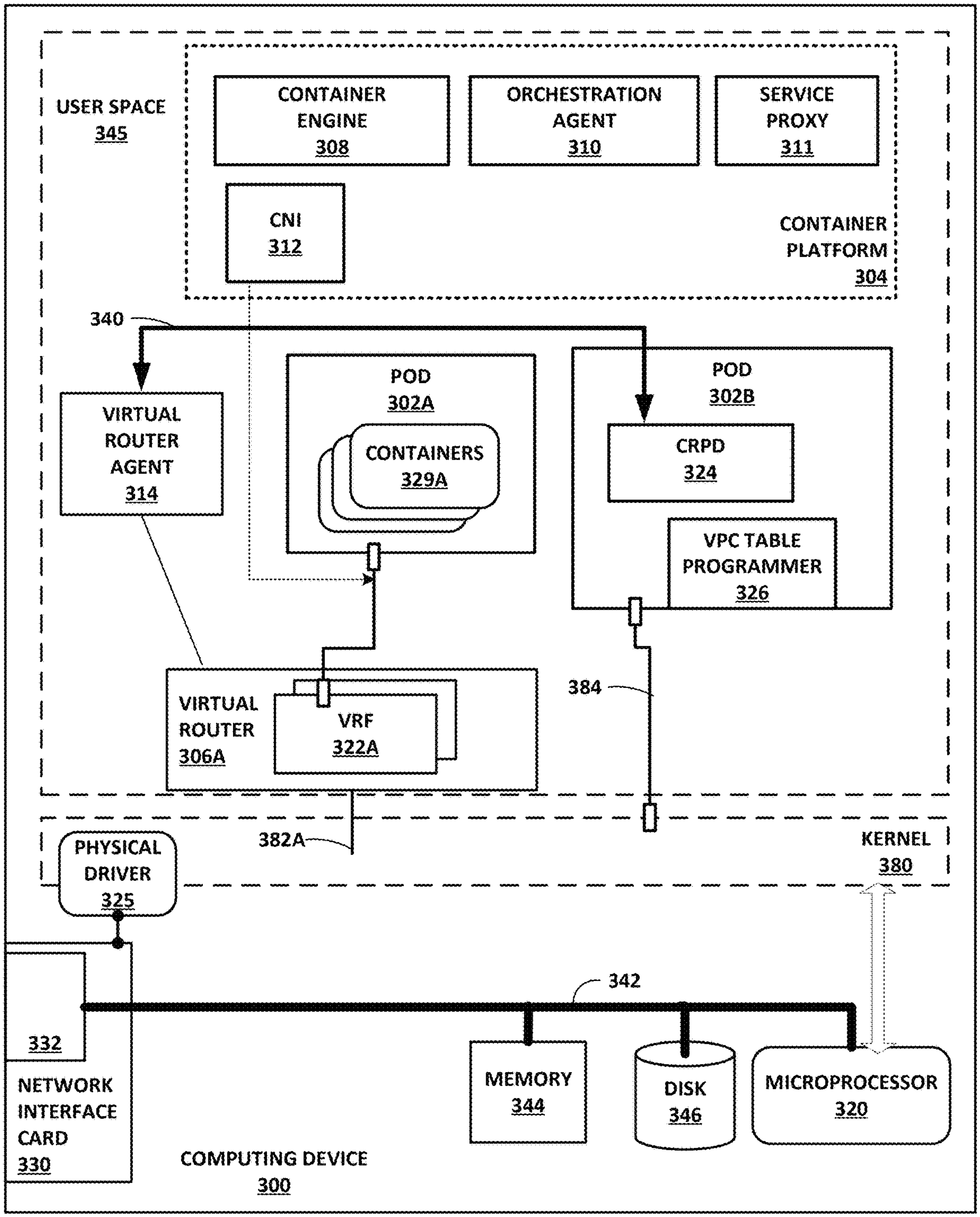
FIG. 4 is a block diagram of an example computing device (e.g., host), according to techniques described in this disclosure.

FIG. 4 is a block diagram of an example computing device (e.g., host), according to techniques described in this disclosure. Computing device 300 of FIG. 4 may represent a physical or virtual server and may represent an example instance of any of servers 12 of FIG. 1. Computing device 300 includes in this example, a bus 342 coupling hardware components of a computing device 300 hardware environment. Bus 342 couples network interface card (NIC) 330, storage disk 346, and one or more microprocessors 210 (hereinafter, "microprocessor 320"). NIC 330 may be SR-IOV-capable. A front-side bus may in some cases couple microprocessor 320 and memory device 344. In some examples, bus 342 may couple memory device 344, microprocessor 320, and NIC 330. Bus 342 may represent a Peripheral Component Interface (PCI) express (PCIe) bus. In some examples, a direct memory access (DMA) controller may control DMA transfers among components coupled to bus 342. In some examples, components coupled to bus 342 control DMA transfers among components coupled to bus 342.

Microprocessor 320 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 320.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory.

Memory 344, NIC 330, storage disk 346, and microprocessor 320 may provide an operating environment for a software stack that includes an operating system kernel 380 executing in kernel space. Kernel 380 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 380 provides an execution environment for one or more processes in user space 345.

Kernel 380 includes a physical driver 325 to use the network interface card 330. Network interface card 330 may also implement SR-IOV to enable sharing the physical network function (I/O) among one or more virtual execution elements, such as containers 329A-329B or one or more virtual machines (not shown in FIG. 2). Shared virtual devices such as virtual functions may provide dedicated resources such that each of the virtual execution elements may access dedicated resources of NIC 330, which therefore appears to each of the virtual execution elements as a dedicated NIC. Virtual functions may represent lightweight PCIe functions that share physical resources with a physical function used by physical driver 325 and with other virtual functions. For an SR-IOV-capable NIC 330, NIC 330 may have thousands of available virtual functions according to the SR-IOV standard, but for I/O-intensive applications the number of configured virtual functions is typically much smaller.

Computing device 300 may be coupled to a physical network switch fabric that includes an overlay network that extends switch fabric from physical switches to software or "virtual" routers of physical servers coupled to the switch fabric, including virtual router 306A. Virtual routers may be processes or threads, or a component thereof, executed by the physical servers, e.g., servers 12 of FIG. 1, that dynamically create and manage one or more virtual networks, which may include VPCs, usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. In the example computing device 300 of FIG. 4, virtual router 306A executes within user space as a virtual router, but virtual router 306A may execute within a hypervisor, a host operating system, a host application, or a virtual machine in various implementations.

Virtual router 306A may replace and subsume the virtual routing/bridging functionality of the Linux bridge/OVS module that is commonly used for Kubernetes deployments of pods 302. Virtual router 306A may perform bridging (e.g., E-VPN) and routing (e.g., L3VPN, IP-VPNs) for virtual networks. Virtual router 306A may perform networking services such as applying security policies, NAT, multicast, mirroring, and load balancing. In some examples, virtual router 306A may perform routing of packets to/from one or more VPCs, such as any of VPC 110 of FIG. 2.

Virtual router 306A can be executing as a kernel module or as a user space DPDK process (virtual router 306A is shown here in user space 345). Virtual router agent 314 may also be executing in user space. In the example computing device 300 of FIG. 4, virtual router 306A executes within user space as a DPDK-based virtual router, but virtual router 306A may execute within a hypervisor, a host operating system, a host application, or a virtual machine in various implementations. In some examples, virtual router agent 314 has a connection to network controller 24 using a channel, which is used to download configurations and forwarding information. Virtual router agent 314 programs this forwarding state to the virtual router data (or "forwarding") plane represented by virtual router 306A. Virtual router 306A and virtual router agent 314 may be processes.

Virtual router 306A may replace and subsume the virtual routing/bridging functionality of the Linux bridge/OVS module that is commonly used for Kubernetes deployments of pods 302. Virtual router 306A may perform bridging (e.g., E-VPN) and routing (e.g., L3VPN, IP-VPNs) for virtual networks. Virtual router 306A may perform networking services such as applying security policies, NAT, multicast, mirroring, and load balancing.

Virtual router 306A may be multi-threaded and execute on one or more processor cores. Virtual router 306A may include multiple queues. Virtual router 306A may implement a packet processing pipeline. The pipeline can be stitched by the virtual router agent 314 from the simplest to the most complicated manner depending on the operations to be applied to a packet. Virtual router 306A may maintain multiple instances of forwarding bases. Virtual router 300 may access and update tables using RCU (Read Copy Update) locks.

To send packets to other compute nodes or switches, virtual router 306A uses one or more physical interfaces 332. In general, virtual router 306A exchanges packets with workloads 104 or 106 (FIG. 2) via one or more of VPCs 110. In some examples, virtual router 306A has multiple virtual network interfaces (e.g., vifs). These interfaces may include the kernel interface, vhost0, for exchanging packets with the host operating system; an interface with virtual router agent 314, pkt0, to obtain forwarding state from the network controller and to send up exception packets. There may be one or more virtual network interfaces corresponding to the one or more physical network interfaces 332. In some examples, virtual router 306A shares a virtual interface with another virtual router facing towards one or more of VPCs 110 (towards workloads 104 or 106). In such a case, virtual router 306A and the other virtual router may be in an active/standby configuration, such as that of CNR 250A and CNR 250B of FIG. 3.

In a kernel-based deployment of virtual router 306A (not shown), virtual router 306A is installed as a kernel module inside the operating system. Virtual router 306A registers itself with the TCP/IP stack to receive packets from any of the desired operating system interfaces that it wants to. The interfaces can be bond, physical, tap (for VMs), veth (for containers) etc. Virtual router 306A in this mode relies on the operating system to send and receive packets from different interfaces. For example, the operating system may expose a tap interface backed by a vhost-net driver to communicate with VMs. Once virtual router 306A registers for packets from this tap interface, the TCP/IP stack sends all the packets to it. Virtual router 306A sends packets via an operating system interface. In addition, NIC queues (physical or virtual) are handled by the operating system. Packet processing may operate in interrupt mode, which generates interrupts and may lead to frequent context switching. When there is a high packet rate, the overhead attendant with frequent interrupts and context switching may overwhelm the operating system and lead to poor performance.

In a DPDK-based deployment of virtual router 306A, virtual router 306A is installed as a user space 345 application that is linked to the DPDK library. This may lead to faster performance than a kernel-based deployment, particularly in the presence of high packet rates. The physical interfaces 332 are used by the poll mode drivers (PMDs) of DPDK rather the kernel's interrupt-based drivers. The registers of physical interfaces 332 may be exposed into user space 345 in order to be accessible to the PMDs; a physical interface 332 bound in this way is no longer managed by or visible to the host operating system, and the DPDK-based virtual router 306A manages the physical interface 332. This includes packet polling, packet processing, and packet forwarding. In other words, user packet processing steps are performed by the virtual router 306A DPDK data plane. The nature of this "polling mode" makes the virtual router 306A DPDK data plane packet processing/forwarding much more efficient as compared to the interrupt mode when the packet rate is high. There are comparatively few interrupts and context switching during packet I/O, compared to kernel-mode virtual router 306A, and interrupt and context switching during packet I/O may in some cases be avoided altogether.

In general, each of pods 302A-302B may be assigned one or more virtual network addresses for use within respective virtual networks, where each of the virtual networks may be associated with a different virtual subnet provided by virtual router 306A. Pod 302B may be assigned its own virtual layer three (L3) IP address, for example, for sending and receiving communications but may be unaware of an IP address of the computing device 300 on which the pod 302B executes. The virtual network address may thus differ from the logical address for the underlying, physical computer system, e.g., computing device 300.

Computing device 300 includes a virtual router agent 314 that controls the overlay of virtual networks for computing device 300 and that coordinates the routing of data packets within computing device 300. In general, virtual router agent 314 communicates with network controller 24 for the virtualization infrastructure, which generates commands to create virtual networks and configure network virtualization endpoints, such as computing device 300 and, more specifically, virtual router 306A, as a well as virtual network interface 212. By configuring virtual router 306A based on information received from network controller 24, virtual router agent 314 may support configuring network isolation, policy-based security, a gateway, source network address translation (SNAT), a load-balancer, and service chaining capability for orchestration.

As noted above, a network controller 24 may provide a logically centralized controller for facilitating operation of one or more virtual networks. The network controller 24 may, for example, maintain a routing information base, e.g., one or more routing tables that store routing information for the physical network as well as one or more overlay networks. Virtual router 306A implements one or more virtual routing and forwarding instances (VRFs), such as VRF 322A, for respective virtual networks for which virtual router 306A operates as respective tunnel endpoints. In general, each VRF 322 stores forwarding information for the corresponding virtual network or a VPC and identifies where data packets are to be forwarded and whether the packets are to be encapsulated in a tunneling protocol, such as with a tunnel header that may include one or more headers for different layers of the virtual network protocol stack. Each of VRFs 322 may include a network forwarding table storing routing and forwarding information for the virtual network. For example, virtual router 306A may learn routes from cRPD 324 via virtual router agent 314, which may include an API, and use such learned routes to construct a forwarding table for each VRF 322.

cRPD 324, acting as a control plane for virtual router 306A, may learn BGP routes of packets flowing through computing device 300. As such, cPRD 324 may program route tables for virtual routers 306 (e.g., via virtual router agent 314). VPC table programmer 326 may communicate with cPRD 324 to learn BGP routes of packets flowing through computing device 300. VPC table programmer 326 may be a table programming agent configured to program VPC route tables, such as VPC route tables 118, of VPC gateways 110. While shown as part of pod 302B, in some examples, rather than being part of a same pod, cPRD 324 and VPC table programmer may be part of different pods. For example, VPC table programmer 326 may execute in a separate pod of pods 302. In some examples, VPC table programmer 326 may be configured to utilize an API, such as an API of a VPC gateway, to interface with the VPC gateway when programming the VPC route table.

VPC route tables 118 may change from instance to instance. For example, if a VPC is restarted, an associated VPC route table may change. In some examples, VPC table programmer 326 may abstract a VPC route table away from a configuration point of view. For example, VPC table programmer 326 may enable an administrator to interact with the VPC route table using a tag (which may be more descriptive), such as "vpc-table-tag": "cnr-aws-vpc-internal-table," rather than a name, such as "RouteTableId": "rtb-08fdf3cc822baa22c." VPC table programmer 326 may perform any translations such as to apply the appropriate policies to the appropriate VPC route tables, or update the appropriate VPC route tables.

An example mapping which VPC table programmer 326 may perform for a VPC gateway 118 follows:

```
[
  {
    "cnr-table-name": "inet.0",
    "cnr-policy-name":"inet-aws-export",
    "cnr-nexthop-interface-name": "eth3",
    "vpc-table-tag":"cnr-aws-vpc-internal-table"
  },
  {
    "cnr-table-name": "oam.inet.0",
    "cnr-policy-name":"oam-aws-export",
    "cnr-nexthop-interface-name": "eth5",
    "vpc-table-tag":"cnr-aws-vpc-external-table-oam"
  },
  {
    "cnr-table-name": "sig.inet.0",
    "cnr-policy-name":"sig-aws-export",
    "cnr-nexthop-interface-name": "eth4",
```

-continued

```
        "vpc-table-tag":"cnr-aws-vpc-external-table-sig"
      },
    ]
```

An example policy statement follows:

```
policy-statement inet-aws-export {
  term 1 {
    from {
      protocol bgp;
      as-path [ as-path-infra-cluster aws-onsite-cluster ];
    }
    then accept;
  }
  then reject;
}
```

An example of programming of a route table towards on-prem network 130 follows:

```
"RouteTables": [
  {
    "RouteTableId": "rtb-08fdf3cc822baa22c",
    "Routes": [
      {
    "DestinationCidrBlock": "10.10.10.4/32",
    "InstanceId": "i-04d12991242918ed8",
    "InstanceOwnerId": "956845549706",
    "NetworkInterfaceId": "eni-0b91bb9d332b6529e",
    "Origin": "CreateRoute",
    "State": "active"
      },
      {
        "DestinationCidrBlock": "10.10.10.17/32",
    "InstanceId": "i-04d12991242918ed8",
    "InstanceOwnerId": "956845549706",
    "NetworkInterfaceId": "eni-0b91bb9d332b6529e",
    "Origin": "CreateRoute",
    "State": "active"
      }
    ],
    "Tags": [
      {
        "Key": "cnr-aws-simulated-vpc-table-sig",
        "Value": ""
      }
    ],
    "VpcId": "vpc-09f812bf56bdee948",
    "OwnerId": "956845549706"
  }
]
```

For traffic flowing towards workloads 104 and 106, VPC table programmer 326 may program an L2 DMAC to identify an appropriate node.

NIC 330 may receive packets having BGP headers. Virtual router 306A processes the packet to determine, from the BGP header, to which BGP speaker the packet is to be routed. For example, a first packet from on-prem network 130 may be destined for BGPS2 of workloads 104B, or a second packet from BGPS1 of workload 106B may be destined for Internet 140 (each of FIG. 2). Virtual router 306A may route the first received packet to VPC 110A and route the second received packet to VPC 116.

Pod 302A includes one or more application containers 329A. Pod 302B includes an instance of cRPD 324. Container platform 304 includes container runtime 308, orchestration agent 310, service proxy 311, and CNI 312.

Container engine 308 includes code executable by microprocessor 320. Container runtime 308 may be one or more computer processes. Container engine 308 runs containerized applications in the form of containers 329A-329B. Container engine 308 may represent a Dockert, rkt, or other container engine for managing containers. In general, container engine 308 receives requests and manages objects such as images, containers, networks, and volumes. An image is a template with instructions for creating a container. A container is an executable instance of an image. Based on directives from controller agent 310, container engine 308 may obtain images and instantiate them as executable containers in pods 302A-302B.

Service proxy 311 includes code executable by microprocessor 320. Service proxy 311 may be one or more computer processes. Service proxy 311 monitors for the addition and removal of service and endpoints objects, and it maintains the network configuration of the computing device 300 to ensure communication among pods and containers, e.g., using services. Service proxy 311 may also manage iptables to capture traffic to a service's virtual IP address and port and redirect the traffic to the proxy port that proxies a backed pod. Service proxy 311 may represent a kube-proxy for a minion node of a Kubernetes cluster. In some examples, container platform 304 does not include a service proxy 311 or the service proxy 311 is disabled in favor of configuration of virtual router 306A and pods 302 by CNI 312.

Orchestration agent 310 includes code executable by microprocessor 320. Orchestration agent 310 may be one or more computer processes. Orchestration agent 310 may represent a kubelet for a minion node of a Kubernetes cluster. Orchestration agent 310 is an agent of an orchestrator, e.g., orchestrator 23 of FIG. 1, that receives container specification data for containers and ensures the containers execute by computing device 300. Container specification data may be in the form of a manifest file sent to orchestration agent 310 from orchestrator 23 or indirectly received via a command line interface, HTTP endpoint, or HTTP server. Container specification data may be a pod specification (e.g., a PodSpec—a YAML (Yet Another Markup Language) or JSON object that describes a pod) for one of pods 302 of containers 329. Based on the container specification data, orchestration agent 310 directs container engine 308 to obtain and instantiate the container images for containers 329, for execution of containers 329 by computing device 300.

Orchestration agent 310 instantiates or otherwise invokes CNI 312 to configure one or more virtual network interfaces for each of pods 302. For example, orchestration agent 310 receives a container specification data for pod 302A and directs container engine 308 to create the pod 302A with containers 329A based on the container specification data for pod 302A. Orchestration agent 310 also invokes the CNI 312 to configure, for pod 302A, virtual network interface for a virtual network corresponding to VRFs 322A. In this example, pod 302A is a virtual network endpoints for a virtual network corresponding to VRF 322A.

CNI 312 may obtain interface configuration data for configuring virtual network interfaces for pods 302. Virtual router agent 314 may operate as a virtual network control plane module for enabling network controller 24 to configure virtual router 306A. Unlike the orchestration control plane (including the container platforms 304 for minion nodes and the master node(s), e.g., orchestrator 23), which manages the provisioning, scheduling, and managing virtual execution elements, a virtual network control plane (including network controller 24 and virtual router agent 314 for minion nodes) manages the configuration of virtual networks implemented in the data plane in part by virtual routers 306A of the minion nodes.

Virtual router agent 314 communicates, to CNI 312, interface configuration data for virtual network interfaces to enable an orchestration control plane element (i.e., CNI 312) to configure the virtual network interfaces according to the configuration state determined by the network controller 24, thus bridging the gap between the orchestration control plane and virtual network control plane. In addition, this may enable a CNI 312 to obtain interface configuration data for multiple virtual network interfaces for a pod and configure the multiple virtual network interfaces, which may reduce communication and resource overhead inherent with invoking a separate CNI 312 for configuring each virtual network interface.

Figure 5:
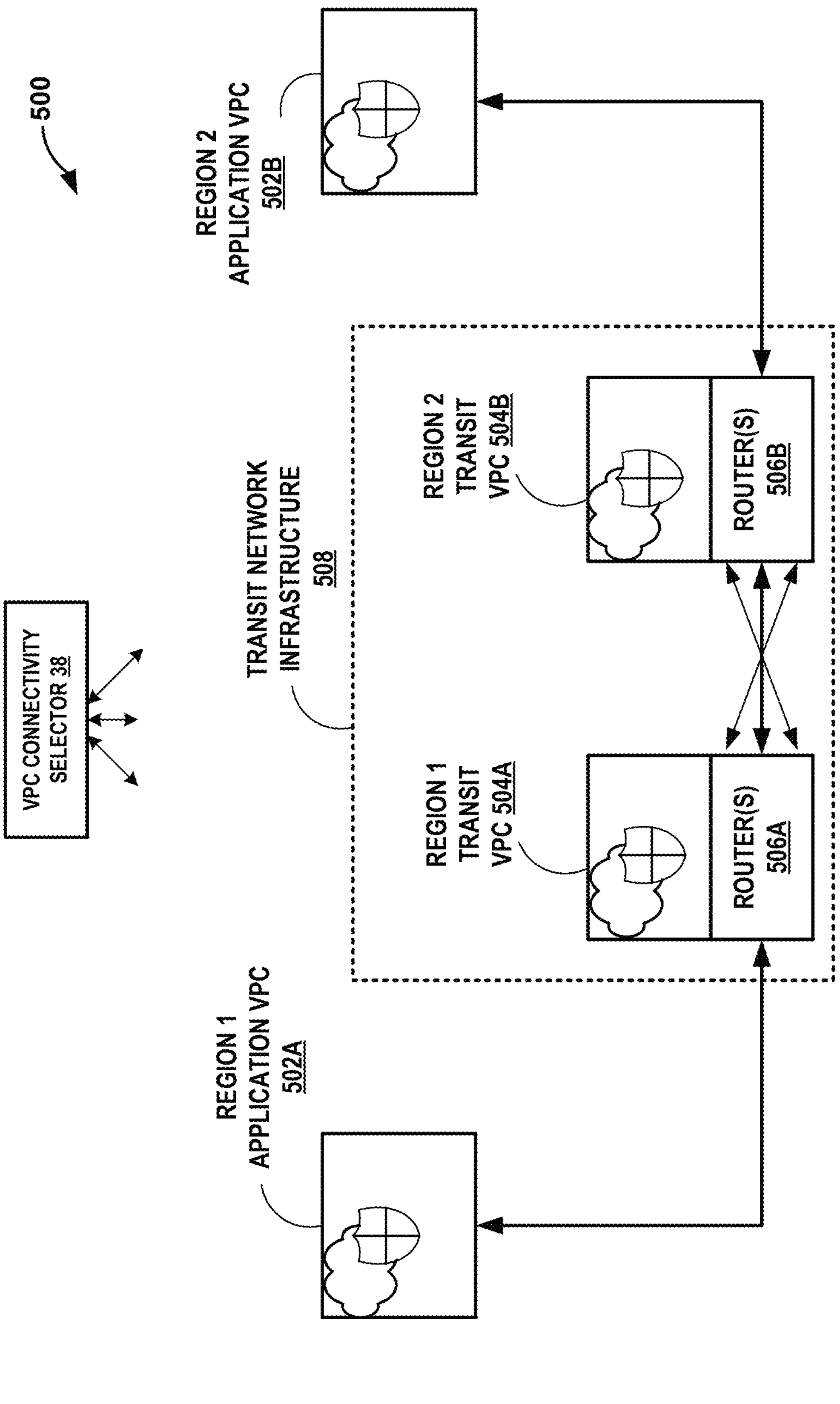
FIG. 5 is a block diagram illustrating an example cloud computing environment in accordance with the techniques of the disclosure.

FIG. 5 is a block diagram illustrating example cloud computing environment 500 in accordance with the techniques of the disclosure. More specifically, FIG. 5 depicts an high-level design example wherein transit network infrastructure 508 interconnects Application VPCs 502A-502B (collectively, "Application VPCs 502"). Application VPC 502A is located in a first region (e.g., "region 1" of FIG. 5), and Application VPC 502B is located in a second region (e.g., "region 2" of FIG. 5). As stated above, transit network infrastructure 508 provides interconnectivity across regions 1 and 2 between Application VPCs 502, and may include one or more transit VPCs 504A-504B (collectively, "transit VPCs 504"). Each transit VPC 504 may be located in a same region as the corresponding Application VPC 502 for which the transit VPC provides interconnectivity. Transit VPCs 504A include multiple corresponding routers 506A-506B (collectively, "routers 506") which operate to transport network traffic across the transit VPC. In some examples, routers 506 are Session Smart Routers (SSRs), as provided by Juniper Networks, Inc. In some examples, routers 506 are SRX series network devices, as provided by Juniper Networks, Inc.

Routers 506 route application traffic across clouds or within multiple regions on the same cloud. In this approach, one or more routers 506 are deployed in a customer's cloud account, in regions where customer application workloads are running. The application workloads forward application traffic to the router 506 deployed in the region. This router 506 routes the application traffic to the last mile router 506 (via zero or more intermediate routers 506, based on the destination). The last mile router 506 delivers the traffic to the destination application workload.

The design is simple, highly available, and scalable. It is flexible enough to adapt to cloud networking infrastructure changes easily. It is not tightly coupled with a cloud provider, and the same design may be used for multiple cloud providers. (Typically, most cloud providers support basic operations to deploy a router 506 as a virtual machine, as well as basic networking operations to route application traffic to the router 506).

As depicted in the example of FIG. 5, routers 506 within a region are deployed in a dedicated VPC, (e.g., routers 506 are deployed within transit VPC 506A within region 1). The example of FIG. 5 depicts traffic flow between application workloads of application VPCs 502 residing in two different regions (e.g., region 1 and region 2). This approach requires connectivity between: (1) transit VPC and transit VPC; and (2) Application VPC and Transit VPC.

First, the use case for connectivity between a Transit VPC and another Transit VPC is discussed. In accordance with the techniques of the disclosure, VPC connectivity selector 38 understands where both transit VPCs 504 reside, and attempts to select an optimal approach.

Consider a case, where both transit VPCs 504 are in different regions of cloud computing environment 500. There may be a number of possible interconnection options, including the use of a transit gateway, or the use of VPC peering.

TABLE 1

Two approaches for VPC interconnection.

| ATTRIBUTES | TRANSIT GATEWAY | VPC PEERING |
|---|---|---|
| COST | 0.05$(/hour) per transit gateway attachment + 0.04$ for GB for inter-region traffic. For example, 1000 GB traffic costs 186$ for a month. (Transit gateway attachment cost = 146$ (4 * 0.05 * 730 hours) + Data cost 40 $ (1000 * 0.04)) | Instances data traffic. (0.02$ for inter regions for a GB). For example, 1000 GB traffic costs 20$ for a month. |
| BANDWIDTH | 50 Gbps per VPC. | No bandwidth limit. |
| LATENCY | Higher (due to the extra hops added by the transit gateways added in each region) | Lower |

In the foregoing example depicted in Table 1, VPC connectivity selector 38 determines that VPC Peering is the best fit for connectivity between transit VPCs 504, due to a number of factors including cost and performance characteristics (e.g., improved bandwidth and latency over the use of a transit gateway).

Next, the use case for connectivity between an Application VPC and a Transit VPC is discussed. Traffic from Application VPCs 502 should be routed to a transit VPC 504. Based on the cloud provider, VPC connectivity selector 38 of FIG. 1, using the techniques described herein, selects a service and/or technique that provides an improved value proposition in terms of performance and cost for the application workload, as described in more detail below.

Consider a case where source application initiating traffic is in Application VPC 502A of cloud computing environment 500. There exist multiple options to connect Application VPC 502A to Transit VPC 504A. For example, an administrator may employ: (1) VPC peering; (2) a Gateway Load Balancer (GWLB); or (3) a transit gateway.

VPC Peering exists as an option for interconnectivity between an Application VPC 502 and Transit VPC 504. However, VPC Peering may not be operable as a solution in some circumstances. Based on the overall advantages of VPC Peering listed above with respect to the transit VPC-transit VPC use case, it would seem like VPC peering may provide a best fit here. However, some cloud providers disallow transitive peering between peers. This means that, if Application VPC 502A wishes to send traffic to Application VPC 502B, then a third Application VPC cannot be used as a transit point to route traffic between Application VPC 502A and Application VPC 502B. This prohibition obviates the use of VPC peering between, e.g., Application VPC 502A and transit VPC 504A to facilitate the routing of traffic from Application VPC 502A to Application VPC 502B.

Figure 6A:
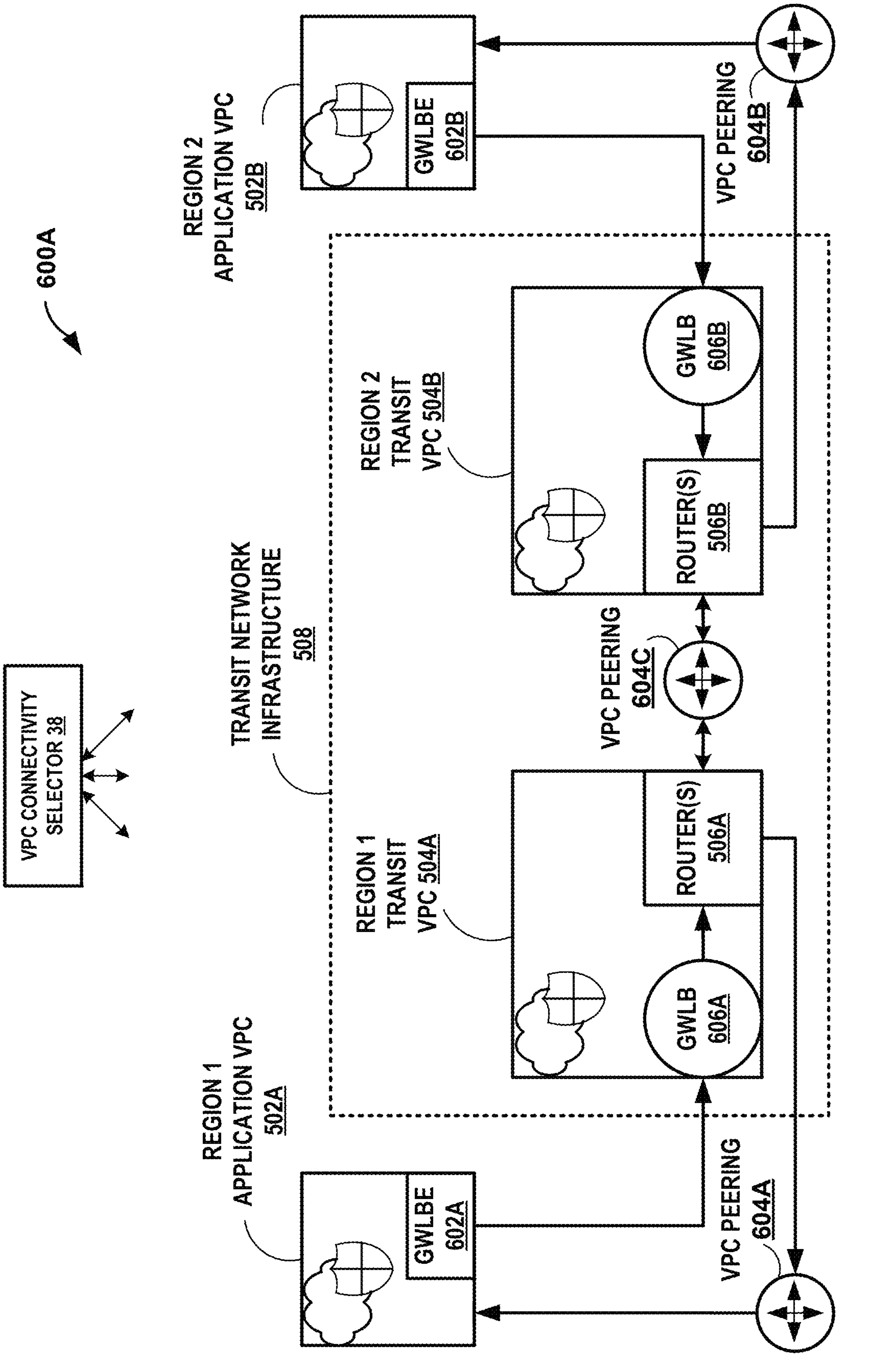
FIG. 6A is a block diagram illustrating an example cloud computing environment in accordance with the techniques of the disclosure.

FIG. 6A is a block diagram illustrating an example cloud computing environment 600A in accordance with the techniques of the disclosure. In some examples, cloud computing environment 600A of FIG. 6A depicts an implementation of cloud computing environment 500 of FIG. 5, wherein application VPCs 502 forward network traffic to transit VPCs 504 via corresponding Gateway Load Balancer End Points (GWLBEs) 602A-602B (collectively, "GWBLEs 602") of application VPCs 502 and GWLBs 606A-606B (collectively, "GWBLs 606") of transit VPCs 504, and wherein transit VPCs 504 forward network traffic to application VPCs 502 and other transit VPCs 504 via VPC peering 604A-604C (collectively, "VPC peering 604").

A GWLB is another option to provide interconnectivity between an Application VPC 502 and Transit VPC 504. A GWLB provides both Layer 3 gateway and Layer 4 load balancing capabilities. The GWLB is a transparent bump-in-the-wire device that does not change any part of the packet. The GWLB is architected to handle millions of requests/second, volatile traffic patterns, and introduces extremely low latency.

GWLBEs are a type of VPC endpoint. A GWLBE creates a secure, low-latency connection so as to introduce as little additional latency as possible and so as to ensure that traffic flowing to and from the virtual appliance is secure. As network traffic flows from a source (an Internet Gateway, a VPC, etc.) to the GWLB, and back, a GWLBE ensures private connectivity between the two. All traffic flows over the cloud network and data is never exposed to the internet, increasing both security and performance.

In some scenarios, the use of a GWLB may be a preferred way to inspect traffic before the traffic reaches a destination. A GWLB sits in a traffic path with backend virtual appliance (s). When traffic hits the GWLB, the GWLB encapsulates the traffic with a GENEVE tunnel and forwards the network traffic to one of the backend virtual appliances based on a 5-tuple (for TCP/UDP flows) or a 3-tuple (for non-TCP/UDP flows) of the network traffic. The virtual appliance decapsulates the GENEVE tunnel and examines the traffic, where the virtual appliance either: (1) drops the network traffic; or (2) encapsulates the network traffic and sends the network traffic back to the GWLB. Finally, the GWLB forwards the network traffic to the destination.

When a GWLB is created in cloud computing environment 500, Elastic Cloud Compute (EC2) instances are chosen from a VPC which act as backend virtual appliances, also called as Target Group. In some examples, a cloud provider creates network interfaces for each of the EC2 instances in the Target Group. The networtable 2 k interface's IP is used by GWLB for GENEVE encapsulation, so that application traffic can be forwarded to a corresponding target group.

Network traffic of Application VPC 502A is forwarded to the GWLB using a next-hop-type Gateway Load Balancer End Point (GWLBE) and a Gateway Load Balancer Endpoint Service (GLWBES). Initially, a GWLBES is created to begin the forwarding of application traffic to the GWLB. Once the GWLBES is created, GWLBE 602A can be created in Application VPC 502A, and a route-table of Application VPC 502A is updated to use GWLBE 602A as a next hop to reach a required destination.

In accordance with the techniques of the disclosure, VPC connectivity selector 38 can tweak the above approach slightly to forward network traffic of application VPCs 502 via transit VPCs 504. GWLBs 606 can be deployed in Transit VPCs 504 where routers 506 reside, with routers 506 acting as the Target Group. GWLBE 602A can be configured in the Application VPC along with route-table modifications such that GWLBE 602A forwards network traffic of Application VPC 502A to routers 506A of transit VPC 504A. Routers 506A can then route traffic to last mile routers 506 based on the selected Transit VPC-Transit VPC technique (e.g., which is via VPC peering 604C in the example of FIG. 6A).

Typically, routers 506 of transit VPCs 504 send return traffic directly to the corresponding Application VPC 502 using VPC Peering 604. This is because, using this configuration, if routers 506A send return traffic to GWLB 606A, then GWLB 606A may simply forward the return traffic back to routers 506A again.

The network traffic of Application VPC 506A reaches GWLB 606A, and is forwarded to the target group (e.g., routers 506A) with GENEVE encapsulation. Routers 506A decapsulate and send the network traffic to destination routers 506B. The destination routers 506B send the network traffic directly to application VPC 502B via VPC Peering 604B.

Return network traffic from destination application VPC 502B flows via GWLB 602B to destination routers 506B with GENEVE encapsulation and reaches the source routers 506A. Source routers 506A send the return network traffic to Application VPC 502A via VPC Peering 604A.

Figure 6B:
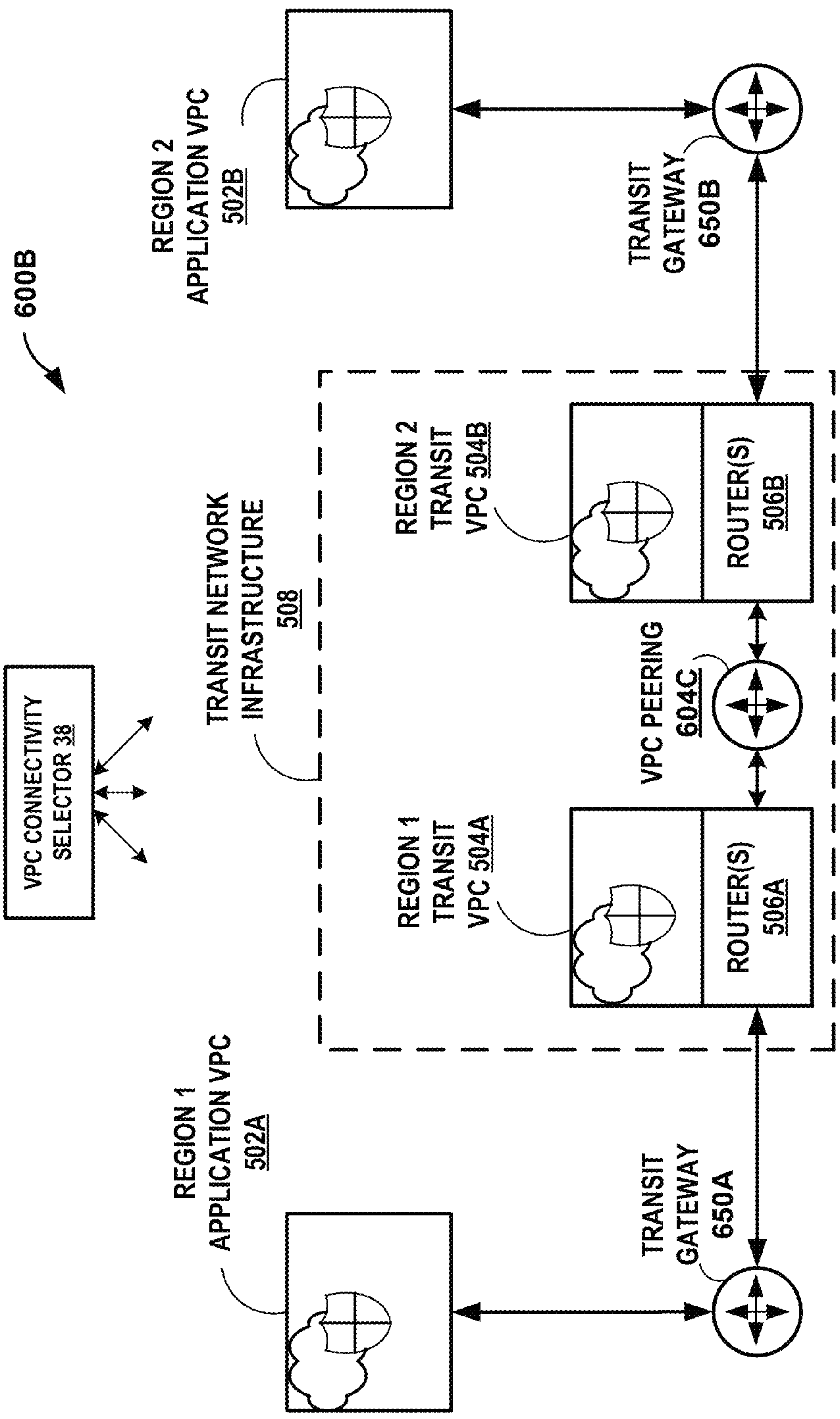
FIG. 6B is a block diagram illustrating an example cloud computing environment in accordance with the techniques of the disclosure.

FIG. 6B is a block diagram illustrating an example cloud computing environment 600B in accordance with the techniques of the disclosure. In some examples, cloud computing environment 600B of FIG. 6B depicts an implementation of cloud computing environment 500 of FIG. 5 wherein application VPCs 502 communicate with transit VPCs 504 via transit gateways 650A-650B (collectively, "transit gateways") and wherein transit VPCs 504 communicate with other transit VPCs 504 via VPC peering 604C.

A Transit Gateway can also be used to provide interconnectivity between an Application VPC 502 and a Transit VPC 504, e.g., so as to send network traffic from application VPC 502A to transit VPC 504A. A Transit Gateway is a network transit hub used to interconnect VPCs and on-premises networks. Multiple Transit Gateways may use cloud provider infrastructure to peer multiple regions together. A Transit Gateway acts as a regional virtual router for traffic flowing between VPCs and on-premises networks. A Transit Gateway scales elastically, based on a volume of network traffic. Typically, routing through a transit gateway operates at Layer 3, where packets are sent to a specific next-hop attachment based on their destination IP addresses.

A Transit Gateway can have one or more routing tables like a VPC, and the appropriate routing table may be looked up when network traffic hits the transit gateway. However, the transit gateway routing table is different from a VPC routing table. When traffic leaves a VPC, the VPC routing table is looked up, and if a next hop is a Transit Gateway, then the traffic is forwarded to the Transit Gateway. However, in a Transit Gateway, a route table associated with the VPC is looked up to forward the traffic further. The route tables of a Transit Gateway enable one to send network traffic of Application VPC 502A to Transit VPC 504A without altering packets. However, EC2 instances (e.g., routers 506A) in Transit VPC 504A may require additional configuration of interfaces so that routers 506A can receive network traffic not destined for itself.

In this example, a Transit Gateway attachment may be required for every application CIDR that needs to be routed. This may easily fill up a cloud provider quota, which may not scale well. Alternately, because the use of Transit Gateways supports GRE, network traffic of application VPCs 502 can be encapsulated and forwarded to the corresponding transit gateway 650.

To send traffic via a Transit Gateway 650, each Application VPC 502 is attached to the corresponding Transit Gateway 650. The 'VPC Attachment' brings the application traffic "as is" to the transit VPC 504. To make GRE encapsulation possible for the application traffic when the network traffic hits the transit VPC 504, an additional attachment, called "Connect," is built on top of the VPC attachment (due to the need for underlay connectivity). Using the "Connect" attachment, routers 506 may perform BGP peering with a transit gateway 650 and receive the GRE encapsulated traffic. As an example, one cloud service provider charges $0.05 per hour for each attachment.

With respect to the example of FIG. 6B, Application VPC 502A performs GRE encapsulation of network traffic for application workloads and forwards the network traffic to Transit Gateway 650A. Transit Gateway 650A forwards the network traffic to source routers 506A. Once the network traffic reaches source routers 506A, source routers 506A decapsulate the network traffic and send the network traffic to the destination routers 506B. The destination routers 506B encapsulate and forward the network traffic to the destination application VPC 502B via Transit Gateway 650B. After receiving the network traffic from Transit Gateway 650B, Application VPC 502B removes the GRE encapsulation.

Referring to FIGS. 5, 6A, and 6B together, in accordance with the techniques of the disclosure, VPC connectivity selector 38 provides interconnectivity selection for Application VPC 502A and transit VPC 504A. Application VPC 502A hosts application instances for one or more clients, the application instances executed by one or more computing devices, such as servers 12. Transit VPC 504A comprises one or more network devices (e.g., one or more routers) that interconnect Application VPC 502A with a remote network.

A plurality of paths interconnect the Application VPC and the transit VPC. For example, a first path, depicted in FIG. 6A, comprises GWLBE 602A of Application VPC 502A and GWLB 606A of transit VPC 606A. A second path, depicted in FIG. 6B, comprises transit gateway 650A that provides interconnectivity between Application VPC 502A and transit VPC 504A. In addition, other paths, of numerous different types, may exist to interconnect Application VPC 502A and transit VPC 504A.

VPC connectivity selector 38 receives, from routers 506 of transit VPC 504A, metrics for network traffic exchanged between Application VPC 502A and transit VPC 504A for the application instances. In some examples, the metrics collected for network traffic exchanged between Application VPC 502A and transit VPC 504A include one or more of a count of newly established connections associated with the application instances over a predetermined time, or a count of newly established packet flows associated with the application instances over the predetermined time. In some examples, the metrics for network traffic include one or more of a count of active connections associated with the application instances over a predetermined time; a count of active packet flows associated with the application instances over the predetermined time; a count of peak concurrent connections associated with the application instances over the predetermined time; or a count of peak concurrent packet flows associated with the application instances over the predetermined time. In some examples, the metrics for network traffic include one or more of an amount of received bytes associated with the application instances over a predetermined time; an amount of transmitted bytes associated with the application instances over the predetermined time; an amount of received packets associated with the application instances over a predetermined time; or an amount of transmitted packets associated with the application instances over the predetermined time. In some examples, the metrics for network traffic include one or more of a latency of the first path and a latency of the second path; a bandwidth consumption of the application instances; a number of active sessions associated with the application instances or a number of total sessions associated with the application instances; or a session rate associated with the application instances.

VPC connectivity selector 38 selects, based at least in part on the received metrics, one of the first path and the second path. In some examples, the selected path is the one of the first path and the second path having a lowest cost to operate. For example, the selected path may be a cheapest option given the bandwidth consumed by the application instances and a number of hops traversed by network traffic associated with the application instances. In some examples, the selected path is the one of the first path and the second path having a highest performance. For example, the selected path may the one of the first path and the second path having a lowest latency. As another example, the selected path may the one of the first path and the second path selected based on multiple metrics, such as latency, bandwidth, jitter, etc.

VPC connectivity selector 38 configures Application VPC 502A to forward subsequent network traffic for the application instances via the selected path. In some examples, VPC connectivity selector 38 configures Application VPC 502A to forward subsequent network traffic for the application instances via the selected path by programming the selected path within a routing base of Application VPC 502A.

In some examples, VPC connectivity selector 38 may select a different path for different applications. For example, VPC connectivity selector 38 may select, based on first metrics received for a first application instance, the first path comprising GWLBE 602A of Application VPC 502A and GWLB 606A of transit VPC 606A. Further, VPC connectivity selector 38 may select, based on second metrics received for a second application instance, the second path comprising transit gateway 650A that provides interconnectivity between Application VPC 502A and transit VPC 504A. VPC connectivity selector 38 configures Application VPC 502A to forward subsequent network traffic for the first application instance via the first path and to forward subsequent network traffic for the second application instance via the second path.

Figure 7:
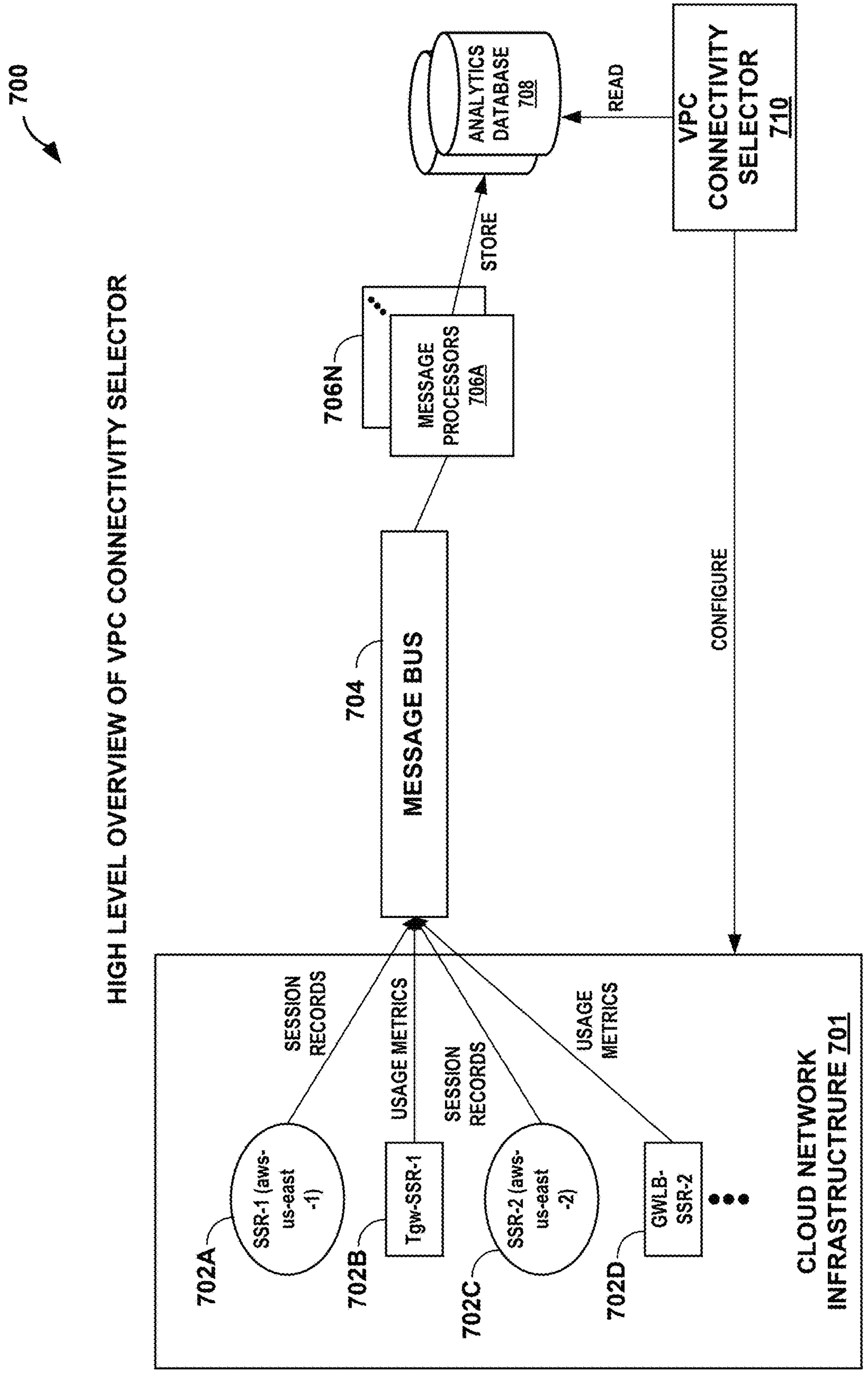
FIG. 7 is a block diagram illustrating an example computing infrastructure in accordance with the techniques of the disclosure.

FIG. 7 is a block diagram illustrating example computing infrastructure 700 in accordance with the techniques of the disclosure. In some examples, computing infrastructure 700 is an example of computing infrastructure 8 of FIG. 1 for configuring interconnectivity between VPCs of a cloud computing environment, such as application VPCs 502 and transit VPCs 504 of FIGS. 5, 6A, and 6B.

Computing infrastructure 700 includes cloud network infrastructure 701, which includes multiple network devices 702A-702D (collectively, "network devices 702"), message bus 704, message processors 706A-706N (collectively, "message processors 706"), analytics database 708, and VPC connectivity selector 710. In some examples, VPC connectivity selector 710 is an example of VPC connectivity selector 38 of FIG. 1.

In some examples, network devices 702A and 702C are SSRs of a transit VPC. Network devices 702A and 702C may collect session records, which comprise records of metrics and performance information for a plurality of communication sessions for a plurality of applications. Each of the session records may be associated with a particular application.

In some examples, network devices 702B and 702D provide transit gateway functionality, and may be, e.g., SRX routers. Network devices 702B and 702D may collect usage metrics for network traffic, and may also collect such usage metrics on a per-application basis.

Message processors 706 receive the session records and usage metrics from network devices 702 via message bus 704, and store the session records and usage metrics within analytics database 708. VPC connectivity selector 710 may select or switch, on a per-application basis, a particular network architecture for interconnectivity between application and/or transit VPCs based at least in part on the session records and usage metrics stored within analytics database 708.

As described above, network connectivity can be achieved by more than one cloud service or technique. For example, a cloud computing environment may provide interconnectivity through either the use of transit gateways or GWLBs, as described above. There are cost and performance implications of each of these architectures, and the particular architecture for interconnectivity between VPCs may depend on a product's specific requirements, or the particular performance requirements or behavior of a particular application.

Table 2 provides an example comparison between an architecture using GWLB and an architecture using transit gateways.

TABLE 2

An example comparison between an architecture using GWLB and an architecture using transit gateways.

| ATTRIBUTES | GWLB | TRANSIT GATEWAY |
|---|---|---|
| ROUTING | Static | Static and Dynamic (BGP) |
| COST | 1000 GB traffic/month cost with GWLB and GWLBE for an AZ is around 30$ | 1000 GB traffic/month is around 103$ |
| TUNNEL (ENCAPSULATION) | GENEVE | GRE (A connect attachment can have 4 GRE tunnels maximum. So, connect attachment is needed for every 4 GRE tunnels.) |
| BANDWIDTH | Unlimited | 5 Gbps per GRE tunnel. |
| AUTO SCALING | Yes - Internally uses the EC2 auto scaling | No - But EC2 auto scaling can be used |

Based on the values of Table 2 above, it seems like an architecture using GWLB may be a more preferable option. However, it is important to understand when the use of GWLB is cheaper, and thus it is important to dive deeper into GWLB cost breakdown.

A Gateway Load Balancer Capacity Unit (GLCU) measures the dimensions on which the GWLB processes traffic (averaged over an hour). The three dimensions measured are: (1) New connections or flows, which is a number of newly established connections or flows per second; (2) Active connections or flows, which is a peak amount of concurrent connections or flows, sampled each minute; and (3) Processed bytes, which is a number of bytes processed by the load balancer in gigabytes. Typically, a customer is charged according to the single one of the three dimensions having a highest usage for the hour. As an example, a GLCU contains 600 new connections/flows per second; 60,000 active connections/flows (sampled per minute); and 1 gigabyte per-hour for EC2 instances, containers, and IP addresses as targets.

To achieve lower costs, it becomes important to understand different attributes of one's traffic. Based on current and forecasted usage and performance requirements, a network administrator may be required to switch between services to achieve lower costs and improved performance. This manual operation is tedious and error prone, considering that the current traffic should largely remain unaffected.

In accordance with the techniques of the disclosure, VPC connectivity selector 710 may actively analyze network traffic of network devices 702, build recommendations for a cost-effective and performant solution, and in addition, may auto-remediate the network architecture by selecting a particular architecture for providing VPC interconnectivity.

As described above, VPC connectivity selector 710 collects network flow records for applications from SSRs 702A, 702C and cloud providers. Additionally, VPC connectivity selector 710 collects operational metrics from cloud provider network services components, such as network devices 702B, 702D. These metrics are primarily communicated to VPC connectivity selector 710 over a distributed Message Bus 704. Message processors 706, which operate in a control plane, collect, clean, transform, and store the records in distributed analytics database 708. Analytics database 708 maintains historical information for every application of the application VPC workloads.

VPC connectivity selector 710 processes this information to build network usage models for customer traffic. Based on this usage modeling (e.g., by modeling and understanding past application behavior), VPC connectivity selector 710 may predict how a traffic pattern of a particular application evolves overtime. Geared with this information, VPC connectivity selector 710 programs the networking infrastructure to provide a performant cost-effective service. For example, VPC connectivity selector 710 programs application VPCs to use a particular network architecture for interconnectivity with transit VPCs.

As an example, consider a 3-tier user service/workload that includes: (1) a web-machine (web-1); (2) app-machines (app-1, app-2); and (3) database-machines (db-1, db-2). Based on historical network flow information stored in analytics database 708, VPC connectivity selector 710 may determine the following: Web-1 has customers mostly located in North America (based on src IP analysis). Web-1 is mostly used in a US time zone, while weekends usually have 80 percent traffic of an overall traffic amount. Db-1 and db-2 open multiple lengthy network sessions at late night, Pacific Standard Time (PST), when web traffic is low (e.g., some data sync operations run every night). Based on this information, VPC connectivity selector 710 determines that GWLB may be preferable for handling the weekend burst of network traffic, while the use of transit gateways may be preferable for weekday operations.

There are several analytics data sources that analytics database 708 may capture to build the application traffic models. In some examples, analytics database 708 stores records of network flow. Each network flow is identified by a 5-tuple, e.g., source IP address, source port, protocol, destination IP address, and destination port. In some examples, the records of network flows may include additional properties or metrics, such as TCP metrics, a number of received and transmitted packets or bytes, latency, etc.

Where network devices 702 are SSRs, such SSRs may forward session records for bidirectional communication sessions to message bus 704, and such session records from different SSRs may be correlated and stored in distributed analytics database 708. As another example, consider that app-1 is connected to ssr-1 (aws-us-east-1) 702A and app-2 is connected to ssr-2 (aws-us-west-1) 702C. Where app-1 initiates communication with app-2, network traffic flows from app-1, to ssr-1 702A, to ssr-2 702C, to app-2. In this case, ssr-1 702A and ssr-2 702C build a session record for a same network flow, and send the session record to analytics database 708. Analytics database 708 correlates these multiple records into a same session record.

VPC connectivity selector 710 may use network flow information to gain valuable insights. For example, VPC connectivity selector 710 may determine, from the network flow information, latency in cloud network infrastructure 701, applications, and SSRs 702, bandwidth consumption, a number of active or total sessions, or a session rate.

In addition, analytics database 710 may store cloud component metrics. The cloud component metrics are valuable to understand how applications use cloud services, such as an overall resource usage, etc. In addition, cloud components like the transit gateway or GWLB provide metrics to traffic collection services, which in turn may be consumed by VPC connectivity selector 710 for selecting a VPC connectivity architecture.

Some of the metrics captured for a transit gateway are depicted in Table 3:

TABLE 3

A subset of metrics captured for a transit gateway.

| Metric | Description |
|---|---|
| BytesIn | A number of bytes received by the transit gateway. |
| BytesOut | A number of bytes sent from the transit gateway. |
| PacketsIn | A number of packets received by the transit gateway. |
| PacketsOut | A number of packets sent by the transit gateway. |

Some of the metrics captured for a GWLB are depicted in Table 4:

| Metric Description | Metric Description |
|---|---|
| ActiveFlowCount | A total number of concurrent flows (or connections) from clients to targets.<br>Reporting criteria: There is a nonzero value<br>Statistics: The most useful statistics are Average, Maximum, and Minimum.<br>3.1.1.2.2.1Dimensions<br>LoadBalancer<br>AvailabilityZone, LoadBalancer |
| ConsumedLCUs | The number of load balancer capacity units (LCU) used by your load balancer. One pays for a number of LCUs that one uses per hour.<br>Reporting criteria: Always reported<br>Statistics: All<br>3.1.1.2.2.2Dimensions<br>LoadBalancer |
| HealthyHostCount | A number of targets that are considered healthy.<br>Reporting criteria: Reported if health checks are enabled<br>Statistics: The most useful statistics are Maximum and Minimum.<br>3.1.1.2.2.3Dimensions<br>LoadBalancer, TargetGroup<br>AvailabilityZone, LoadBalancer, TargetGroup |
| NewFlowCount | A total number of new flows (or connections) established from clients to targets in the time period.<br>Reporting criteria: There is a nonzero value<br>Statistics: The most useful statistic is Sum.<br>3.1.1.2.2.4Dimensions<br>LoadBalancer<br>AvailabilityZone, LoadBalancer |

-continued

| Metric Description | Metric Description |
|---|---|
| ProcessedBytes | A total number of bytes processed by the load balancer. This count includes traffic to and from targets, but not health check traffic.<br>Reporting criteria: There is a nonzero value.<br>Statistics: The most useful statistic is Sum.<br>3.1.1.2.2.5Dimensions<br>LoadBalancer<br>AvailabilityZone, LoadBalancer |
| UnHealthyHostCount | A number of targets that are considered unhealthy.<br>Reporting criteria: Reported if health checks are enabled.<br>Statistics: The most useful statistics are Maximum and Minimum.<br>3.1.1.2.2.6Dimensions<br>LoadBalancer, TargetGroup<br>AvailabilityZone, LoadBalancer, TargetGroup |

In some examples, the metrics collected for network traffic exchanged between an Application VPC and a transit VPC include one or more of a count of newly established connections associated with the application instances over a predetermined time, or a count of newly established packet flows associated with the application instances over the predetermined time. In some examples, the metrics for network traffic include one or more of a count of active connections associated with the application instances over a predetermined time; a count of active packet flows associated with the application instances over the predetermined time; a count of peak concurrent connections associated with the application instances over the predetermined time; or a count of peak concurrent packet flows associated with the application instances over the predetermined time. In some examples, the metrics for network traffic include one or more of an amount of received bytes associated with the application instances over a predetermined time; an amount of transmitted bytes associated with the application instances over the predetermined time; an amount of received packets associated with the application instances over a predetermined time; or an amount of transmitted packets associated with the application instances over the predetermined time. In some examples, the metrics for network traffic include one or more of a latency of the first path and a latency of the second path; a bandwidth consumption of the application instances; a number of active sessions associated with the application instances or a number of total sessions associated with the application instances; or a session rate associated with the application instances.

Therefore, VPC connectivity selector 710, operating as described herein, may provide multi-cloud connectivity by deploying network devices 702, such as SSRs, in cloud regions where Application VPCs are present. VPC connectivity selector 710 may select between multiple different architectures for interconnectivity between VPCs, such as GWLB or transit gateways, so as to provide interconnectivity between an Application VPC and a Transit VPC. As described above, a cloud computing infrastructure may modify a conventional GWLB to provide connectivity between an Application VPC and a Transit VPC, which could provide a cheaper option in certain cases while maintaining performance. The VPC connectivity selector 710 described herein may collects network flows (from, e.g., SSRs) and additional metrics from cloud services, and analyze them to provide valuable tweaks or edits to the overall network architecture, with the goal of minimizing costs and increasing networking performance.

Figure 8:
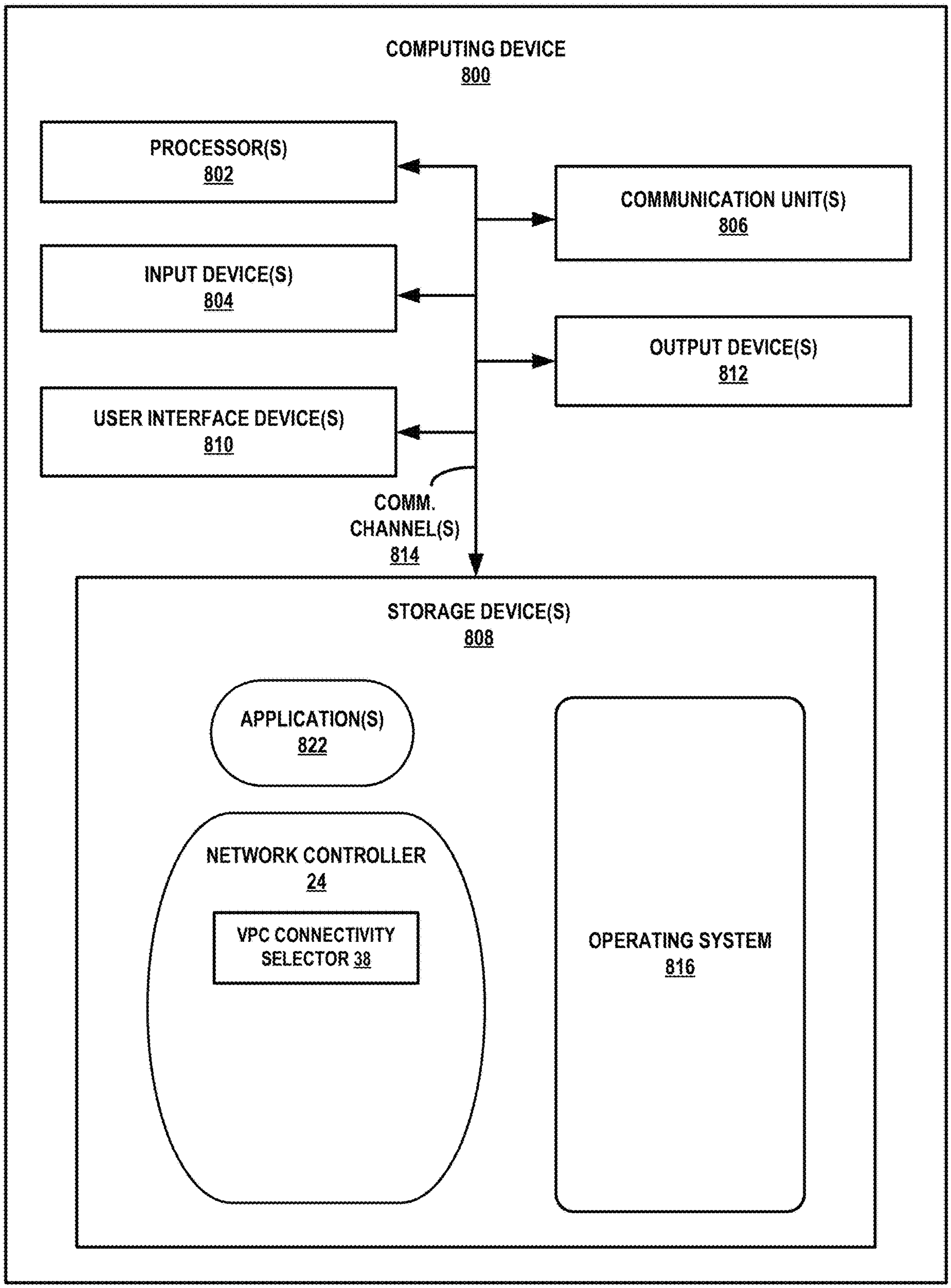
FIG. 8 is a block diagram illustrating an example computing device in accordance with the techniques of the disclosure.

FIG. 8 is a block diagram illustrating an example computing device in accordance with the techniques of the disclosure. FIG. 8 may illustrate a particular example of a server or other computing device 800 that includes one or more processor(s) 802 for executing network controller 24 and/or VPC connectivity selector 38 of FIG. 1. Other examples of computing device 800 may be used in other instances. Although shown in FIG. 8 as a stand-alone computing device 800 for purposes of example, a computing device may be any component or system that includes one or more processors or other suitable computing environment for executing software instructions and, for example, need not necessarily include one or more elements shown in FIG. 8 (e.g., communication units 806; and in some examples components such as storage device(s) 808 may not be co-located or in the same chassis as other components). Computing device 800 may be located and execute, for example, within any of servers 12 of FIG. 1, another interconnection facility, or at a branch office or cloud computing environment employed or used by a cloud exchange provider.

As shown in the specific example of FIG. 8, computing device 800 includes one or more processors 802, one or more input devices 804, one or more communication units 806, one or more output devices 812, one or more storage devices 808, and user interface (UI) device 810, and communication unit 806. Computing device 800, in one example, further includes one or more applications 822, network controller 24, and operating system 816 that are executable by computing device 800. Each of components 802, 804, 806, 808, 810, and 812 are coupled (physically, communicatively, and/or operatively) for inter-component communications. In some examples, communication channels 814 may include a system bus, a network connection, an inter-process communication data structure, or any other method for communicating data. As one example, components 802, 804, 806, 808, 810, and 812 may be coupled by one or more communication channels 814.

Processors 802, in one example, are configured to implement functionality and/or process instructions for execution within computing device 800. For example, processors 802 may be capable of processing instructions stored in storage device 808. Examples of processors 802 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 808 may be configured to store information within computing device 800 during operation. Storage device 808, in some examples, is described as a computer-readable storage medium. In some examples, storage device 808 is a temporary memory, meaning that a primary purpose of storage device 808 is not long-term storage. Storage device 808, in some examples, is described as a volatile memory, meaning that storage device 808 does not maintain stored contents when the computer is turned off. Examples of volatile memories include random access memories (RAM), dynamic random access memories (DRAM), static random access memories (SRAM), and other forms of volatile memories known in the art. In some examples, storage device 808 is used to store program instructions for execution by processors 802. Storage device 808, in one example, is used by software or applications running on computing device 800 to temporarily store information during program execution.

Storage devices 808, in some examples, also include one or more computer-readable storage media. Storage devices 808 may be configured to store larger amounts of information than volatile memory. Storage devices 808 may further be configured for long-term storage of information. In some examples, storage devices 808 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 800, in some examples, also includes one or more communication units 806. Computing device 800, in one example, utilizes communication units 806 to communicate with external devices via one or more networks, such as one or more wired/wireless/mobile networks. Communication units 806 may include a network interface card, such as an Ethernet card, an optical transceiver, a radio frequency transceiver, or any other type of device that can send and receive information. Other examples of such network interfaces may include 3G and WiFi radios. In some examples, computing device 800 uses communication unit 806 to communicate with an external device.

Computing device 800, in one example, also includes one or more user interface devices 810. User interface devices 810, in some examples, are configured to receive input from a user through tactile, audio, or video feedback. Examples of user interface devices(s) 810 include a presence-sensitive display, a mouse, a keyboard, a voice responsive system, video camera, microphone or any other type of device for detecting a command from a user. In some examples, a presence-sensitive display includes a touch-sensitive screen.

One or more output devices 812 may also be included in computing device 800. Output device 812, in some examples, is configured to provide output to a user using tactile, audio, or video stimuli. Output device 812, in one example, includes a presence-sensitive display, a sound card, a video graphics adapter card, or any other type of device for converting a signal into an appropriate form understandable to humans or machines. Additional examples of output device 812 include a speaker, a cathode ray tube (CRT) monitor, a liquid crystal display (LCD), or any other type of device that can generate intelligible output to a user.

Computing device 800 may include operating system 816. Operating system 816, in some examples, controls the operation of components of computing device 800. For example, operating system 816, in one example, facilitates the communication of one or more applications 822, network controller 24, and VPC connectivity selector 38 with processors 802, communication unit 806, storage device 808, input device 804, user interface devices 810, and output device 812.

Application(s) 822, network controller 24, and VPC connectivity selector 38 may also include program instructions and/or data that are executable by computing device 800. Application 822, network controller 24, and VPC connectivity selector 38 may include instructions for causing computing device to perform one or more of the operations and actions described in the present disclosure with respect to orc network controller 24, and VPC connectivity selector 38.

Figure 9:
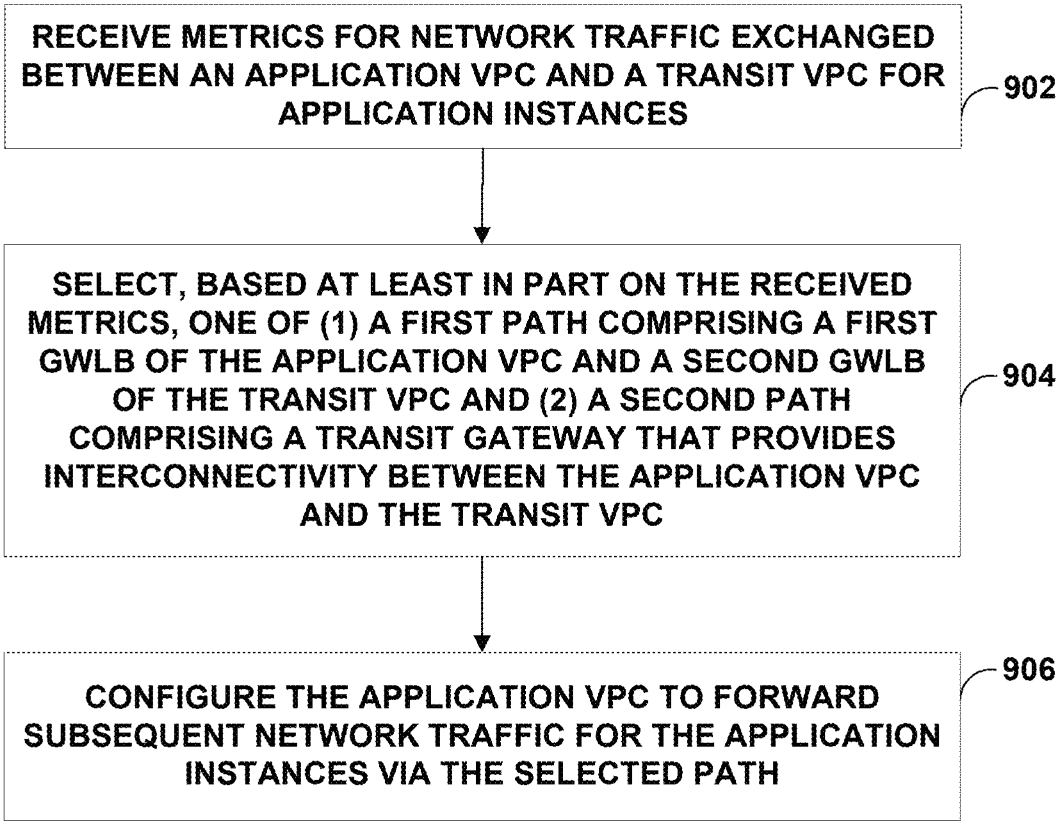
FIG. 9 is a flow diagram illustrating an example operation in accordance with the techniques of the disclosure.

FIG. 9 is a flow diagram illustrating an example operation in accordance with the techniques of the disclosure. FIG. 9 is described with respect to FIGS. 1, 5, and 6A-6B, for convenience.

In the example of FIG. 9, VPC connectivity selector 38 provides interconnectivity selection for Application VPC 502A and transit VPC 504A. Application VPC 502A hosts application instances for one or more clients, the application instances executed by one or more computing devices, such as servers 12. Transit VPC 504A comprises one or more network devices (e.g., one or more routers) that interconnect Application VPC 502A with a remote network.

A plurality of paths interconnect the Application VPC and the transit VPC. For example, a first path, depicted in FIG. 6A, comprises GWLBE 602A of Application VPC 502A and GWLB 606A of transit VPC 606A. A second path, depicted in FIG. 6B, comprises transit gateway 650A that provides interconnectivity between Application VPC 502A and transit VPC 504A. In addition, other paths, of numerous different types, may exist to interconnect Application VPC 502A and transit VPC 504A.

VPC connectivity selector 38 receives, from routers 506 of transit VPC 504A, metrics for network traffic exchanged between Application VPC 502A and transit VPC 504A for the application instances (902). In some examples, the metrics collected for network traffic exchanged between Application VPC 502A and transit VPC 504A include one or more of a count of newly established connections associated with the application instances over a predetermined time, or a count of newly established packet flows associated with the application instances over the predetermined time. In some examples, the metrics for network traffic include one or more of a count of active connections associated with the application instances over a predetermined time; a count of active packet flows associated with the application instances over the predetermined time; a count of peak concurrent connections associated with the application instances over the predetermined time; or a count of peak concurrent packet flows associated with the application instances over the predetermined time. In some examples, the metrics for network traffic include one or more of an amount of received bytes associated with the application instances over a predetermined time; an amount of transmitted bytes associated with the application instances over the predetermined time; an amount of received packets associated with the application instances over a predetermined time; or an amount of transmitted packets associated with the application instances over the predetermined time. In some examples, the metrics for network traffic include one or more of a latency of the first path and a latency of the second path; a bandwidth consumption of the application instances; a number of active sessions associated with the application instances or a number of total sessions associated with the application instances; or a session rate associated with the application instances.

VPC connectivity selector 38 selects, based at least in part on the received metrics, one of the first path and the second path (904). In some examples, the selected path is the one of the first path and the second path having a lowest cost to operate. For example, the selected path may be a cheapest option given the bandwidth consumed by the application instances and a number of hops traversed by network traffic associated with the application instances. In some examples, the selected path is the one of the first path and the second path having a highest performance. For example, the selected path may the one of the first path and the second path having a lowest latency. As another example, the selected path may the one of the first path and the second path selected based on multiple metrics, such as latency, bandwidth, jitter, etc.

VPC connectivity selector 38 configures Application VPC 502A to forward subsequent network traffic for the application instances via the selected path (906). In some examples, VPC connectivity selector 38 configures Application VPC 502A to forward subsequent network traffic for the application instances via the selected path by programming the selected path within a routing base of Application VPC 502A.

The techniques described herein may be implemented in hardware, software, firmware, or any combination thereof. Various components, functional units, and/or modules illustrated in the figures and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise one or more computer data storage mediums, such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A computing system comprising:

processing circuitry and a memory comprising instructions executable by the processing circuitry to cause the computing system to execute a controller for an Application virtual private cloud (VPC), the Application VPC configured to host a first application instance of a first application type and a second application instance of a second application type, and a transit VPC comprising one or more routers configured to interconnect the Application VPC with a remote network, wherein a plurality of paths interconnect the Application VPC and the transit VPC, a first path of the plurality of paths comprising a gateway load balancer endpoint (GWLBE) of the Application VPC and a gateway load balancer (GWLB) of the transit VPC, and a second path of the plurality of paths comprising a transit gateway that provides interconnectivity between the Application VPC and the transit VPC, and wherein the controller is configured to:

receive, from the one or more routers of the transit VPC, first metrics for network traffic exchanged between the Application VPC and the transit VPC for the first application instance and second metrics for network traffic exchanged between the Application VPC and the transit VPC for the second application instance;

select, based at least in part on the first metrics received for the first application instance, the first path for subsequent network traffic for the first application instance;

select, based at least in part on the second metrics received for the second application instance, the second path for subsequent network traffic for the second application instance; and configure the Application VPC to forward the subsequent network traffic for the first application instance via the first path and the subsequent network traffic for the second application instance via the second path.

2. The computing system of claim 1, wherein the one or more routers of the transit VPC and one or more computing devices configured to execute the first application instance and the second application instance are located within a same geographic region.

3. The computing system of claim 1, wherein to configure the Application VPC to forward the subsequent network traffic for the first application instance via the first path, the controller is configured to program the first path within a routing base of the Application VPC.

4. The computing system of claim 1, wherein the first metrics for network traffic exchanged between the Application VPC and the transit VPC for the first application instance comprise at least one of:

a count of newly established connections associated with the first application instance over a predetermined time; or a count of newly established packet flows associated with the first application instance over the predetermined time.

5. The computing system of claim 1, wherein the first metrics for network traffic exchanged between the Application VPC and the transit VPC for the first application instance comprise at least one of:

a count of active connections associated with the first application instance over a predetermined time;

a count of active packet flows associated with the first application instance over the predetermined time;

a count of peak concurrent connections associated with the first application instance over the predetermined time; or a count of peak concurrent packet flows associated with the first application instance over the predetermined time.

6. The computing system of claim 1, wherein the first metrics for network traffic exchanged between the Application VPC and the transit VPC for the first application instance comprise at least one of:

an amount of received bytes associated with the first application instance over a predetermined time;

an amount of transmitted bytes associated with the first application instance over the predetermined time;

an amount of received packets associated with the first application instance over a predetermined time; or an amount of transmitted packets associated with the first application instance over the predetermined time.

7. The computing system of claim 1, wherein the first metrics for network traffic exchanged between the Application VPC and the transit VPC for the first application instance comprise at least one of:

a latency of the first path and a latency of the second path;

a bandwidth consumption of the first application instance;

a number of active sessions associated with the first application instance or a number of total sessions associated with the first application instance; or a session rate associated with the first application instance.

8. The computing system of claim 1, wherein the controller is configured to select the first path based on a first cost of the first path being lower than a second cost of the second path.

9. The computing system of claim 1, wherein the controller is configured to select the first path based on a first latency of the first path being lower than a second latency of the second path.

10. A method comprising:

receiving, by a controller for an Application virtual private cloud (VPC), the Application VPC configured to host a first application instance of a first application type and a second application instance of a second application type, and a transit VPC comprising one or more routers configured to interconnect the Application VPC with a remote network, from the one or more routers of the transit VPC, first metrics for network traffic exchanged between the Application VPC and the transit VPC for the first application instance and second metrics for network traffic exchanged between the Application VPC and the transit VPC for the second application instance, wherein the controller is executed by processing circuitry;

selecting, by the controller and based at least in part on the first metrics received for the first application instance, a first path of a plurality of paths interconnecting the Application VPC and the transit VPC for subsequent network traffic for the first application instance, the first path comprising a gateway load balancer endpoint (GWLBE) of the Application VPC and a gateway load balancer (GWLB) of the transit VPC;

selecting, by the controller and based at least in part on the second metrics received for the second application instance, a second path of the plurality of paths for subsequent network traffic for the second application instance, the second path comprising a transit gateway that provides interconnectivity between the Application VPC and the transit VPC; and configuring, by the controller, the Application VPC to forward the subsequent network traffic for the first application instance via the first path and the subsequent network traffic for the second application instance via the second path.

11. The method of claim 10, wherein the one or more routers of the transit VPC and one or more computing devices configured to execute the first application and the second application instance are located within a same geographic region.

12. The method of claim 10, wherein configuring the Application VPC to forward the subsequent network traffic for the first application instance via the first path comprises programming the first path within a routing base of the Application VPC.

13. The method of claim 10, wherein the first metrics for network traffic exchanged between the Application VPC and the transit VPC for the first application instance comprise at least one of:

a count of newly established connections associated with the first application instance over a predetermined time; or a count of newly established packet flows associated with the first application instance over the predetermined time.

14. The method of claim 10, wherein the first metrics for network traffic exchanged between the Application VPC and the transit VPC for the first application instance comprise at least one of:

a count of active connections associated with the first application instance over a predetermined time;

a count of active packet flows associated with the first application instance over the predetermined time;

a count of peak concurrent connections associated with the first application instance over the predetermined time; or a count of peak concurrent packet flows associated with the first application instance over the predetermined time.

15. The method of claim 10, wherein the first metrics for network traffic exchanged between the Application VPC and the transit VPC for the first application comprise at least one of:

an amount of received bytes associated with the first application instance over a predetermined time;

an amount of transmitted bytes associated with the first application instance over the predetermined time;

an amount of received packets associated with the first application instance over a predetermined time; or an amount of transmitted packets associated with the first application instance over the predetermined time.

16. The method of claim 10, wherein the first metrics for network traffic exchanged between the Application VPC and the transit VPC for the first application instance comprise at least one of:

a latency of the first path and a latency of the second path;

a bandwidth consumption of the first application instance;

a number of active sessions associated with the first application instance or a number of total sessions associated with the first application instance; or a session rate associated with the first application instance.

17. The method of claim 10, wherein selecting the first path is based on at least one of:

a first cost of the first path being lower than a second cost of the second path; or a first latency of the first path being lower than a second latency of the second path.

18. Non-transitory, computer-readable media comprising instructions executable by processing circuitry to cause a computing system to:

execute a controller for an Application virtual private cloud (VPC), the Application VPC configured to host a first application instance of a first application type and a second application instance of a second application type, and a transit VPC comprising one or more routers configured to interconnect the Application VPC with a remote network, wherein a plurality of paths interconnect the Application VPC and the transit VPC, a first path of the plurality of paths comprising a gateway load balancer endpoint (GWLBE) of the Application VPC and a gateway load balancer (GWLB) of the transit VPC, and a second path of the plurality of paths comprising a transit gateway that provides interconnectivity between the Application VPC and the transit VPC, and wherein the controller is configured to:

receive, from the one or more routers of the transit VPC, first metrics for network traffic exchanged between the Application VPC and the transit VPC for the first application instance and second metrics for network traffic exchanged between the Application VPC and the transit VPC for the second application instance;

select, based at least in part on the first metrics received for the first application instance, the first path for subsequent network traffic for the first application instance;

select, based at least in part on the second metrics received for the second application instance, the second path for subsequent network traffic for the second application instance; and configure the Application VPC to forward the subsequent network traffic for the first application instance via the first path and the subsequent network traffic for the second application instance via the second path.

* * * * *